United States Patent
Forte et al.

(10) Patent No.: US 11,087,058 B1
(45) Date of Patent: Aug. 10, 2021

(54) PREVENTION OF FRONT-SIDE PROBING ATTACKS

(71) Applicant: University of Florida Research Foundation, Inc., Gainesville, FL (US)

(72) Inventors: Domenic J. Forte, Gainesville, FL (US); Mark M. Tehranipoor, Gainesville, FL (US); Qihang Shi, Beijing (CN); Huanyu Wang, Gainesville, FL (US); Haoting Shen, Reno, NV (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 0 days.

(21) Appl. No.: 16/745,744

(22) Filed: Jan. 17, 2020

(51) Int. Cl.
*G06F 30/33* (2020.01)
*H01L 23/00* (2006.01)

(52) U.S. Cl.
CPC ............ *G06F 30/33* (2020.01); *H01L 23/573* (2013.01)

(58) Field of Classification Search
CPC ............................... G06F 30/33; H01L 23/573
See application file for complete search history.

(56) References Cited

U.S. PATENT DOCUMENTS

2002/0074671 A1* 6/2002 Tanaka ................... G06F 30/39
257/787
2017/0186706 A1* 6/2017 Guilley ................. H01L 23/576

* cited by examiner

*Primary Examiner* — Vuthe Siek
(74) *Attorney, Agent, or Firm* — Thomas | Horstemeyer, LLP

(57) ABSTRACT

Embodiments of systems and methods for an FIB-aware anti-probing physical design flow are described in the present disclosure. Such embodiments incorporate new and improved security-critical steps in a physical design flow, in which the design is constrained to provide coverage on asset nets through an internal shield.

20 Claims, 23 Drawing Sheets

PREVENTION OF FRONT-SIDE PROBING ATTACKS

BACKGROUND

In light of the increasing performance of integrated circuits (ICs), society's reliance on these electronic computing systems is deepening. Meanwhile, various software and hardware-based attacks are threatening the integrity and confidentiality of security-critical information stored in ICs, such as cryptographic keys, firmware, communication credentials, device configuration, and private data. Solutions to protect against cyber and non-invasive physical attacks (e.g., buffer overflow and side channel analysis) have been widely explored; however, sufficient investigation on countermeasures against physical probing attacks is lacing.

In a probing attack, the internal wires of security-critical IC devices, such as smart cards, smart phones, military systems, and financial systems, are physically tapped to extract sensitive information. Even if the design is equipped with protection mechanisms, an attacker is still likely to bypass the protection and expose the signal nets carrying security-critical information through focused ion beam (FIB) systems. FIB is a powerful circuit editing tool that can mill and deposit material on silicon dies with nanometer level precision. Note that FIB's resolution is keeping pace with technology scaling. Further, FIBs are available to rent or purchase second-hand at low cost. In the Internet-of-Things (IoT) era, the threat from a probing attack is aggravated, since there will be a larger volume of low-end devices which are physically accessible.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1A:
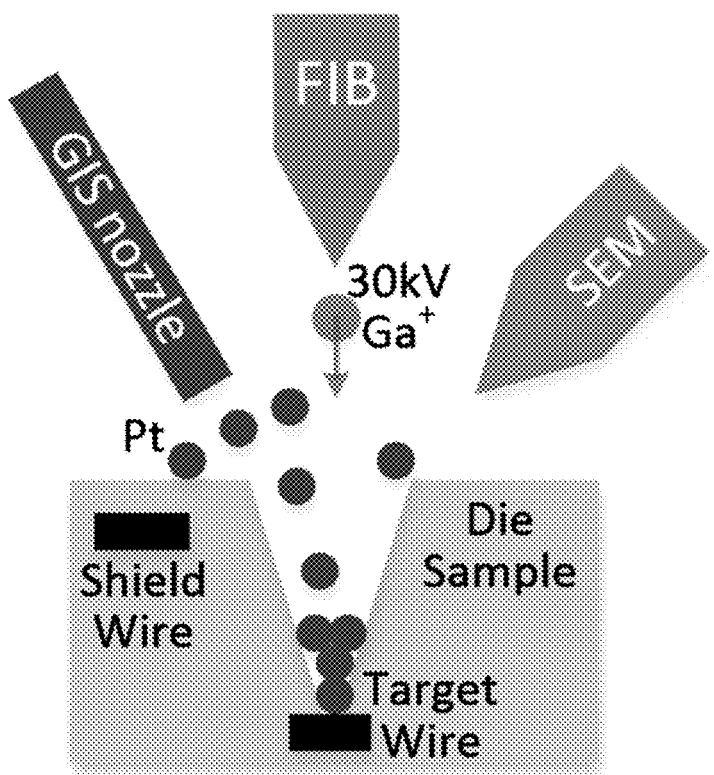
FIGS. 1A-1B illustrate a technique for implementing a physical probe attack on an integrated circuit device.

The present disclosure describes systems, apparatuses, and methods for performing an exemplary focused ion beam (FIB)-aware anti-probing physical design flow within an integrated circuit design system. In one exemplary embodiment, such a method, among others, comprises obtaining a gate level netlist from a functional design of an integrated circuit device; identifying target nets within the netlist that are vulnerable to a physical probe attack; identifying internal nets within the netlist to be used as shield nets to protect at least the target nets; and generating a design of a layout of the integrated circuit device in which the target nets are placed on a target layer of the integrated circuit device and the identified internal nets are placed on at least one internal layer of the integrated circuit device that covers the target layer. In various embodiments, a copy of the shield nets is placed on the target layer with a comparator circuit component, and the comparator circuit component is configured to compare signals generated by the shield nets on the upper internal layer and the copy of the shield nets on the target layer and detect a physical probe attack by finding a mismatch between the signals.

It is noted that existing countermeasures against a physical probing attack are ad hoc with inefficient protection, are not designed to counter an FIB-based attack, and require prohibitive area and design overhead. Further, there is no current holistic and efficient approach that can be easily incorporated into a conventional application-specific integrated circuit (ASIC) design flow to protect security-critical circuits and nets from a probing attack. The present disclosure presents contributions to mitigate front-side probing attack by offering a highly-automated physical layout design flow that mitigates the threat of front-side probing attacks and is easy to integrate into existing electronic design automation (EDA) design flows. Embodiments of the present disclosure incorporate an internal shield design that is not limited to top layer and full-die area shapes and does not require an extra pattern generator circuit which can dramatically reduce area and routing overhead. Because the shield is placed on an internal layer rather than the top layer of an integrated circuit design, the shield is more difficult to reverse engineer, bypass, or reroute. Instead of dedicated pattern generators, an exemplary shield design in accordance with the present disclosure uses nets from an existing functional design for the integrated circuit that is identified using a shield net identification metric. In one embodiment, the shield net identification metric is developed to choose the best layers for multilayer shield designs based on technology specifications, which may provide better protection to security critical nets than a single layer shield. Accordingly, a probing target identification metric is developed to identify security-critical nets that are most likely to be targeted for probing attacks, thus enabling a shield design that does not have to cover an entire die area. Such nets include those directly connected to a security asset as well as nets in the asset's fanout from which sensitive information may be derived. Examples are provided in the present disclosure that are focused on, but not limited to, electrical probing from the front-side (that is assumed to be performed by milling a cavity to expose the sensitive net, depositing a conductor in the cavity to build a contact pad on chip surface, and probing at the pad to extract sensitive information). For example, exemplary techniques of the present disclosure can also apply to back-side attacks targeting low-layer interconnects that occur through the silicon substrate of an integrated circuit device rather than top-level passivation layer.

As a general overview on probing attacks and related research, an asset is an information resource worth protecting from extraction by a would-be adversary. The compromise of assets can cause tremendous damage to intellectual properties, digital privacy, and digital rights management. Examples of assets that are likely targeted in a probing attack include: keys (e.g., private keys used for encryption/decryption operations), firmware and bitstream (e.g., instruction codes of microprocessors and configuration bitstream of field programmable gate arrays), on-device protected data (e.g., sensitive information such as financial data, personal health information, passwords, etc. stored on chip), device configuration (e.g., configuration data that controls the access permission of a device or a module), and cryptographic random numbers (e.g., random numbers generated as keys, one-time pads, and initialization vectors).

It is important that an assessment of a protective design should be performed with a full knowledge about the attack it intends to prevent. Typical probing attacks involve the following steps: (1) decapsulation; (2) reverse engineering of the chip under attack; (3) locating the target wires; (4) exposing the target wires to probes; and (5) extracting target information from signals collected with the probe.

To expose the chip die, the chip package needs to be partially or fully removed depending on the occupied area of the attacker's probing target wires. This is the first stage of most invasive physical attacks, which requires sufficient practice handling noxious chemicals, such as fuming nitric acid combined with acetone at 60° C. to remove plastic packages. The attacker can also remove the copper plate mechanically from the back-side to decapsulate the chip without chemical etching. Next, detailed design information can be extracted through reverse engineering, which is the iterative process of delayering and imaging to figure out the structure and functionality of the chip. Identifying the asset nets is one of the most important job for the step of reverse engineering in the case of probing attack. The probing target wires' (asset nets) locations can then be figured out by one-to-one correspondence between the netlist and layout. Reverse engineering can also help determine whether the cut of a wire would impact the asset extraction or not. Advanced automatic tools, such as ICWorks from Chipworks Inc., pix2net from MicroNet Solutions Inc., and ChipJuice from Texplained, can perform netlist extraction automatically from images of each layer captured through optical or scanning electron microscopes (SEM), which accelerates the reverse engineering process to a great degree.

After the probing target nets have been identified by the reverse engineering step, the next step is physically locating the metal wires associated with the target nets on the IC under attack. The main challenge of this step is that, although the attacker has located the probing target wires on the sacrificial chips during reverse engineering process, the target coordinates obtained from previous experience may not be absolutely accurate on the chip under attack because of the chip-to-chip variation. Further, the attacker has to blindly find the coordinates for milling the chip under attack, because the attacker cannot expose anything on the targeted device beyond absolute necessity to help him/her locate target wires, which requires a precise-enough kinematic mount, and fiducial markers (i.e., visual points of reference on the device) to base these coordinates. When the probing target wires are located on the chip under attack, the next step is to expose the target wire and build a conducting path for probing without damaging any other parts of the circuitry, e.g. wires or vias surrounding the target wire, on the chip. Modern FIB systems, such as Zeiss ORION NanoFab which can edit out obstructing circuitry with 5 nm level precision, may be used to accomplish this step.

Figure 1B:
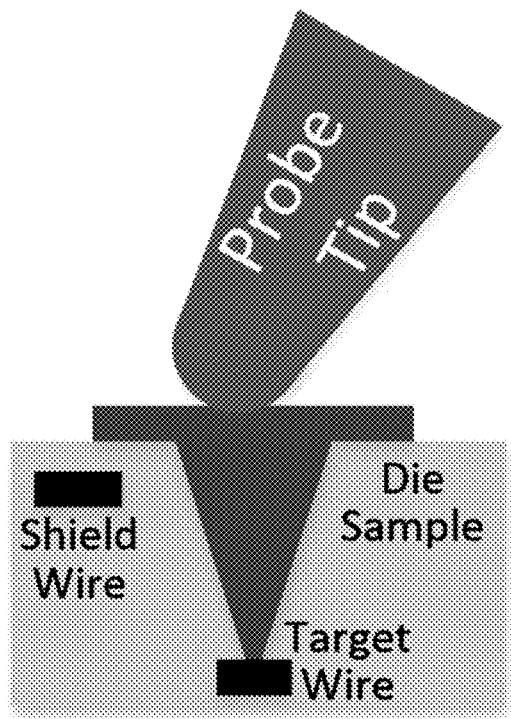

First, a cavity is milled on the chip to expose target wires on a lower layer as shown in FIG. 1A. Then, the gas injection system (GIS) nozzle installed at the front-side surface of the integrated circuit device or chip will release platinum (Pt) or tungsten (W) gas, whose atoms could be deposited in the milling cavity to build a conducting path that can serve as electrical probe contacts under the help of high energy ion beam, as shown in FIG. 1B. The high resolution of modern FIB systems implies that many probing attack countermeasures can be eliminated by simply cutting a few wires. Note that a FIB equipped attack can typically place no more than eight simultaneous probes to inject signals by a function generator or capture signals by a logic analyzer.

The last step of probing attack is to extract the asset signals. As long as the asset wires are properly exposed and connected to the conducting path without triggering any probing alarms from active or analog shields, the asset signals can be extracted using a probing station. There are few difficulties for this step. First, some software and hardware processes might need to be synchronized and completed before the asset is available. Further, the asset information may only exist for a very short period, e.g. only few clock cycles. In addition, if the chip has an internal clock source to prevent external manipulation, the attacker will need to either disable it or synchronize his own clock with it. Each step can have a number of alternative techniques where success with only one of them is necessary. For example, locating target wires in layout can be done by reverse engineering the design or with information from a similar intellectual property (IP) core. Obfuscation can force the attacker to spend more time on this step, but if the IP core is reused in another design, it would allow an attacker to circumvent it.

Recent countermeasures, e.g., active shield, analog shield, and t-private circuit, have been proposed to protect security-critical circuits against front-side probing attacks, i.e., those that occur from the passivation layer and through upper metal layers. Active shield is the most common method, which detects milling by placing a wire mesh carrying a dynamic signal as a protective shield on the top-most metal layer of the chip. To detect the attack, a digital pattern is transferred through the shield wires, and the received signals are compared with the same pattern from the lower metal layers. If a mismatch at a comparator circuit component is detected, an alarm will be triggered, which results in a security action such as an erasure of sensitive information or a shut-down of the device. Unfortunately, large area & design overhead and routing congestion are imposed on the design by the active shield. Further, the active shield may be easily disabled or bypassed by FIB's circuit edit capability. Analog shield, which measures analog parameters of the shield mesh, such as capacitance and delay to detect the attack, can be an alternative approach to active shield. However, the main challenge for analog shield is the low reliability due to process variation in advanced technology nodes. Additionally, in a t-private circuit approach, a security-critical circuit is transformed so that at least t+1 probes are required within one clock cycle to extract 1-bit information. Although t-private circuit increases the probing attack's difficulty and time cost, its O(t2) times area overhead for design transformation is prohibitively expensive.

Embodiments of the present disclosure feature an FIB-aware anti-probing physical design flow that incorporates automated security-aware floorplanning, cell placement, routing, and evaluation in order to protect security-critical nets against front-side probing attacks by using a chip's internal functional nets as 'shield' nets on upper layers to provide coverage for 'target' nets (i.e., those carrying asset signals) on lower layers in the design. Thus, another copy of the shield nets is routed in lower layers and a comparator circuit component can detect a mismatch between a signal on the upper shield net and the signal from a copy of the shield net at the lower layer. In various embodiments, an alarm can be triggered to take the appropriate actions (e.g., terminate the operation of the chip or remove all asset information). Note that by leveraging the internal functional nets of the design itself for protection without adding extra-large circuitry, like the pattern generator and shielding circuit in an active shield approach, the overhead of an exemplary FIB-aware anti-probing physical design flow is very low. In addition, when shield nets are placed within internal metal layers of the integrated circuit device, they will be far more difficult for an attacker to bypass and reroute than dedicated shields, like an active shield, which typically resides at the top metal layer, since the metal wires above the shield layer will be difficult to circumvent during the attack. Further, various embodiments of the FIB-aware anti-probing physical design flow is implemented using computer-aided design (CAD) tools, which can be completely automatic and uniform for different designs so that the design overhead to build an exemplary internal shield will be very limited.

Figure 2:
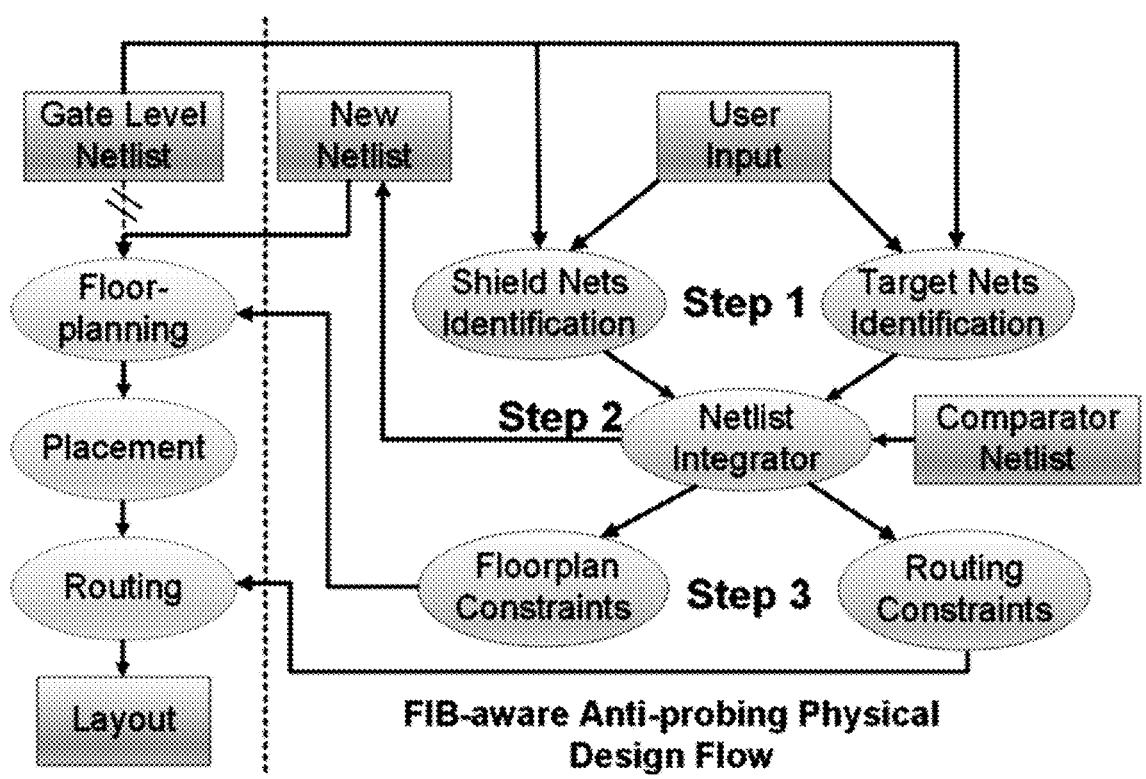
FIG. 2 illustrates an exemplary FIB-aware anti-probing physical design flow in accordance with embodiments of the present disclosure.

The overall workflow of one embodiment of an FIB-aware anti-probing physical design flow is shown in FIG. 2. First, appropriate shield nets and target nets are identified from a gate level netlist of a design for an integrated circuit device for optimal protection against a probing attack of the integrated circuit device. User input can be used to help identify the target nets and shield nets such as inputs related to asset information and threshold values. A comparator circuit component is inserted in the gate-level netlist of the original design to detect a mismatch of signals between the shield nets. The comparator itself is also protected as a potential probing target, and the length of the comparator is determined by the number of shield nets needed for the dedicated design. In general, both inputs of the comparator are connected to the same source nets, but one is the exact shield net from upper layer, while the other one is the copy from the lower layer. These will be implemented in a routing constraint step. Next, floorplanning and wire routing of the design are constrained to build the internal shield and provide protection on target nets against probing attacks.

In general, nets that are connected to assets are the most likely to be probed. In addition, an attacker can also probe nets that are not directly connected to an asset, but still contain valuable information from which the asset can be derived. For example, let us assume that a two-input XOR gate where one input is connected to an asset, e.g., encryption key, and the other input is connected to an input that an attacker can control, e.g., a plain-text input. Then, the attacker can infer the asset by controlling the plain-text input to logic 0 and probing the output of the XOR gate because the asset input is consistent with the output when the other input of the XOR gate is logic 0. Therefore, in addition to nets that are directly connected to assets, other nets which can be exploited to extract the asset can also be protected against probing attack. Since it is inefficient to protect all nets in a system-on-chip (SoC), a probing target identification metric is used to rank the nets according to their ability to leak asset information. Accordingly, the nets' likelihood of being targeted for probing can be deduced. Note, in various embodiments, the probing target identification metric applies for the possible information leakage from pure signal propagation and simplex logic combinations, in which those nets that can be used to derive asset information by complicated mathematics process, e.g. the net in the last round of an encryption module for typical fault injection attacks, are not covered in the probing target identification metric and can instead be declared as a kind of special asset in the user input.

In one embodiment, an exemplary FIB-aware anti-probing physical design flow involves circuit designers inputting the name of nets/ports where an asset is located, e.g., the name of key nets, as user input. Then a probing target net identification technique is performed to identify all nets which are likely to be targeted for a probing attack. This technique utilizes a Target Score metric ($f_{TS}(i)$) to identify the target nets. For each net i in the circuit, the Target Score is defined as:

$$f_{TS}(i) = \frac{f_{IL}(i)}{f_{PD}(i) + 1} \quad (1)$$

where $f_{IL}(i)$ denotes information leakage and quantifies the amount of asset information leaked by observing net i. In other words, $f_{IL}(i)$ quantifies how much sensitive information can be directly inferred if net i is probed and observed by the attacker and is defined as the number of asset bits that net i is associated with divided by the number of possible logic combinations of the associated asset bits. $f_{IL}(i)$ is calculated for each net and is evaluated on a gate-by-gate basis from input to output, as explained in the next section below. $f_{PD}(i)$ indicates the difficulty in propagating an asset signal to net i. A larger value of $f_{IL}(i)$ means more asset information can be at net i. On the other hand, a larger $f_{PD}(i)$ value indicates that it is more difficult to propagate an asset signal to net i. Hence, a higher $f_{TS}(i)$ represents a higher likelihood of being targeted for probing.

Figure 3A:
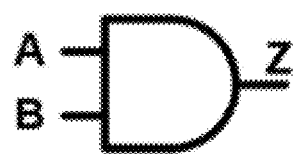
FIGS. 3A-3D illustrate AND gate examples for illustrating information leakage calculation in accordance with embodiments of the present disclosure.

To show how $f_{IL}(i)$ can be derived, let's consider a 2-input AND gate, as shown in FIG. 3A. However, please note that a similar process can also be used to evaluate $f_{IL}(i)$ for other types of standard cell gates. In the present example, the information leakage calculation can be classified into the following three categories: Case 1, Case 2, and Case 3.

Figure 3B:
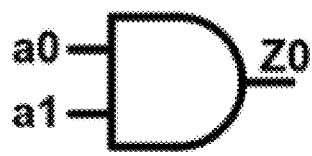

For Case 1, all inputs are fanout nets of assets. In this case, all inputs of the gate are associated with the assets. FIG. 3B shows an example of Case 1, where a0 and a1 are both asset signals. If an attacker probes the net Z0, then he/she can extract some information about the asset a0 and a1. The following four Equations (2a)-(2d) can be used to calculate the information leakage at Z0 ($f_{IL}(Z0)$):

$$F_{C,k}(Z0) = \sum_{\substack{Gate(m,n)=k \\ (k,m,n \in \{0,1\})}} f_{C,m}(a0) \times f_{C,n}(a1) \quad (2a)$$

$$f_B(Z0) = f_B(a0) + f_B(a1) \quad (2b)$$

$$f_{IL,k}(Z0) = \frac{f_B(Z0)}{f_{C,k}(Z0)} \quad (2c)$$

$$f_{IL}(Z0) = \sum_{k=0}^{1} f_{IL,k}(Z0) \times \frac{f_{C,k}(Z0)}{2^{f_B(Z0)}} = \frac{f_B(Z0)}{2^{f_B(Z0)} - 1} \quad (2d)$$

where k, m, and n is the logic value: 0 or 1; Gate(m,n)=k is the gate function to make k at the output with two inputs m and n (m AND n=k, in the FIG. 3B example). Six numerical measures (k=0 or 1) for input nets, a0 and a1, are considered as illustrated in Tables I-II (below). Here, all measures for asset nets (e.g., a0 and a1) would be 1, while they would be 0 for non-asset nets that lie outside of any asset propagation path. The information leakage calculation for other types of gate is similar to the AND gate. Thus, for all types of gates, equations (2a)-(2d) are the same, while the Gate function is updated accordingly. However, the total $f_{IL}(Z0)$(Equation 2(d)) is not a function of $f_{C,0}(Z0)$ and $f_{C,1}(Z0)$, which means the total information leakage calculation for different types of gates is a uniform function of the number of asset bits associated with the calculated net. Therefore, the total information leakage for any net in the circuit can be calculated from only Equation 2(d). To know the specific information leakage when a specific value, 0 or 1, is observed at net i, all four Equations (2a)-(2d) should be calculated.

TABLE I

| Measures | Description |
| --- | --- |
| $f_{C,k}(i)$ | Number of asset signal combinations to make k (0 or 1) at net i |
| $f_B(i)$ | Number of asset bits in the fan-in of net i |
| $f_{IL,k}(i)$ | Information leakage when net i is k (0 or 1) |
| $f_{IL}(i)$ | Overall information leakage of net i |

TABLE II

| Measures | a0 | a1 | Z0 | a2 | n0 | Z1 | n1 | n2 | Z2 |
| --- | --- | --- | --- | --- | --- | --- | --- | --- | --- |
| $f_{C,0}(i)$ | 1 | 1 | 1 + 1 + 1 = 3 | 1 | 0 | 1 | 0 | 0 | 0 |
| $f_{C,1}(i)$ | 1 | 1 | 1 | 1 | 0 | 1 | 0 | 0 | 0 |
| $f_B(i)$ | 1 | 1 | 1 + 1 = 2 | 1 | 0 | 1 | 0 | 0 | 0 |
| $f_{IL,0}(i)$ | 1 | 1 | 2/3 | 1 | 0 | 1 | 0 | 0 | 0 |
| $f_{IL,1}(i)$ | 1 | 1 | 2/1 | 1 | 0 | 1 | 0 | 0 | 0 |
| $f_{IL}(i)$ | 1 | 1 | ½ + ½ = 1 | 1 | 0 | 1 | 0 | 0 | 0 |

Figure 3C:
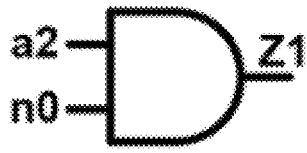

For Case 2, one of the inputs is a fanout net of assets. In this case, one input of the gate is associated with assets while the remaining input is controllable by the attacker. FIG. 3C shows an example of case 2, where a2 is an asset net and n0 is a non-asset net that is not associated with any asset but can be controlled by an attacker. Here, the attacker can control n0 to observe a2 from Z1. Therefore, the information leakage for Z1 is the same as asset input a2. The information leakage measures for nets in FIG. 3C are shown in Table II (above).

Figure 3D:
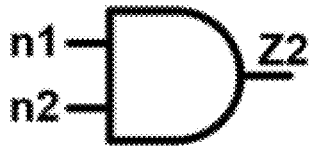

For Case 3, no input is a fanout net of assets. In this case, both inputs of the gate are non-asset signals that are not associated with any asset. FIG. 3D shows an example of case 3, where n1 and n2 are non-asset nets. Therefore, the information leakage for Z2 is 0. The information leakage measures for nets in FIG. 3D are shown in Table II (above).

$f_{PD}(i)$ quantifies the difficulty to propagate asset information to net i (i.e., propagation difficulty metric) using SCOAP (Sandia Controllability and Observability Analysis Program) combinational controllability metric (CC0 and CC1). When both inputs of a gate are fanout nets of an asset which have non-zero information leakage value (e.g. FIG. 3B), there is no need to control other nets to propagate asset information to the output Z0. Therefore, the $f_{PD}(Z0)$ for Z0 is set to 0. When one of the inputs is a fanout net of an asset (e.g. a2 in FIG. 3C), n0 needs to be 1 to propagate a2's information to Z1.

$CC1_{n0}$ measures the 1-controllability value for net n0. Assuming n0 is a primary input, then the $CC1_{n0}$ would be 1 and $f_{PD}(Z0)=CC1_{n0}=1$ for Z1. When net i is located n stages after asset signals, the $f_{PD}(i)$ is the summation of n 1/0-controllability values of the non-asset input of the gate for each stage to propagate asset information to a next stage.

Figure 4A:
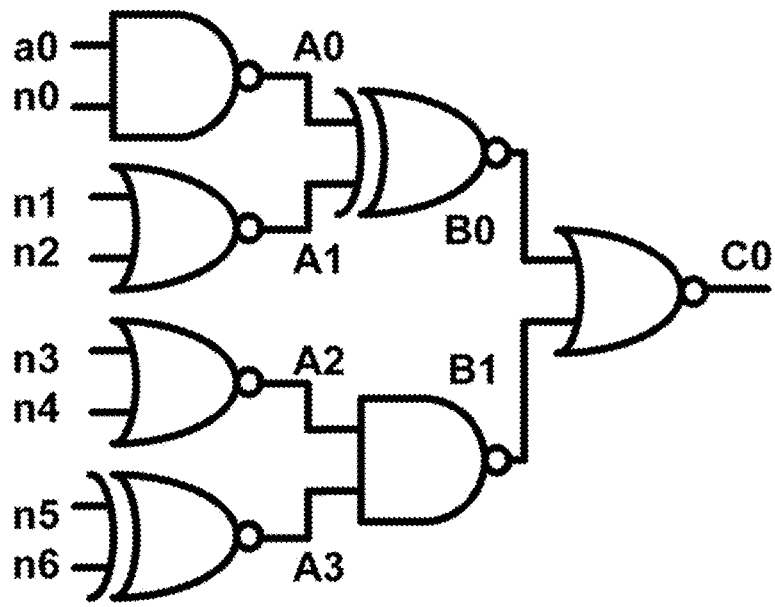
FIGS. 4A-4B illustrate sample circuits for target score calculations in accordance with embodiments of the present disclosure.
Figure 4B:
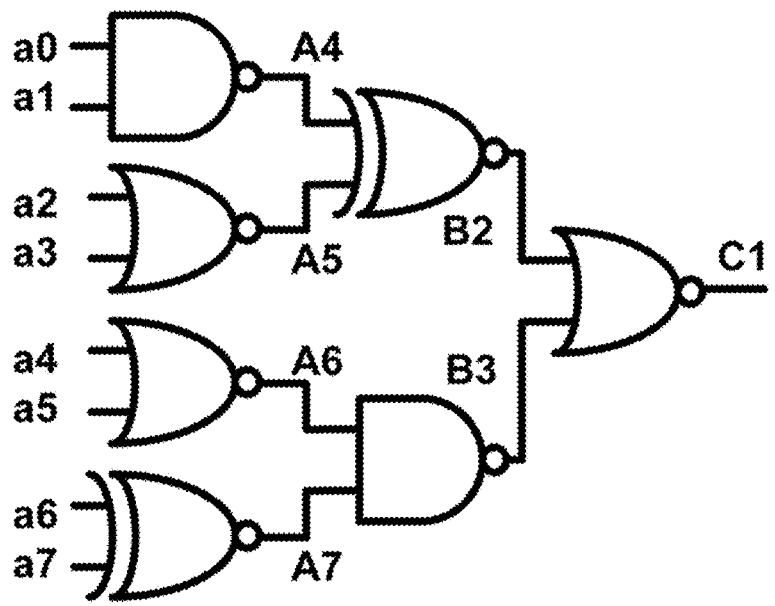

Table III (below) shows the target score calculation using Equation (1) for Z0, Z1, Z2 in FIGS. 3B, 3C, and 3D, assuming n0, n1, n2 are non-asset primary inputs. In FIG. 3D, since both inputs are non-asset nets without any information leakage, the target score for Z2 is 0. FIGS. 4A-4B and Table IV (below) show the target score metric calculation on two sample circuits where different types of gates and inputs are mixed. a0-a7 are asset signals while n0-n6 are non-asset primary inputs. In FIG. 4A, the information leakage value ($f_{IL}(i)$) on a0 propagation path (a0-A0-B0-C0)

stays at 1, and the target score decreases due to the increasing difficulty to control nets (n0=1, A1=1, B1=0) to propagate asset information to a next stage. On the other hand, in FIG. 4B, all the inputs are asset signals and the information leakage values decrease stage by stage, which indicates they are less likely to be targeted in a probing attack.

TABLE III

| Measures | a0 | a1 | Z0 | a2 | n0 | Z1 | n1 | n2 | Z2 |
|---|---|---|---|---|---|---|---|---|---|
| $f_{IL}(i)$ | 1 | 1 | 1 | 1 | 0 | 1 | 0 | 0 | 0 |
| $f_{PD}(i)$ | 0 | 0 | 0 | 0 | 1 | 1 | 0 | 0 | 0 |
| $f_{TS}(i)$ | 1 | 1 | 1 | 1 | 0 | ½ | 0 | 0 | 0 |

TABLE IV

| Net | CC0 | CC1 | $f_{IL}(i)$ | $f_{PD}(i)$ | $f_{TS}(i)$ |
|---|---|---|---|---|---|
| a0-a7 | INF | INF | 1 | 0 | 1 |
| n0-n6 | 1 | 1 | 0 | 0 | 0 |
| A0 | INF | 2 | 1 | $CC1_{n0} = 1$ | 0.5 |
| A1 | 2 | 3 | 0 | 0 | 0 |
| A4-A7 | INF | INF | 1 | 0 | 1 |
| B0 | 5 | 5 | 1 | $CC1_{A1} = 3$ | 0.25 |
| B1 | 7 | 3 | 0 | 0 | 0 |
| B2-B3 | INF | INF | 0.5 | 0 | 0.5 |
| C0 | 4 | 9 | 1 | $CC1_{A1} + CC0_{B1} = 10$ | 1/11 |
| C1 | INF | INF | 1/16 | 0 | 1/16 |

To implement the probing target identification metric on a large circuit, the target score can be calculated from the primary inputs to the primary outputs. For example, a flip-flop can be treated as a buffer which maintains the target score and information leakage values as its input. Feedback nets, in the initialization stage, can be simplified as non-asset nets with a zero target score and information leakage values. Later, with the process of target score calculation, they will finally be assigned an updated value for target score and information leakage. Considering the sensitivity of the asset and the acceptable protection overhead, a threshold value for the target score can be set to identify nets which are most likely targeted for a probing attack. Thus, any net whose target score is larger than this threshold value should be protected accordingly against a probing attack. It can be observed from FIGS. 4A-4B and Table IV (above) that the target scores for {C0, C1} are much lower than the other nets closer to asset nets. Therefore, {C0, C1} may be excluded from the target nets list, which indicates that only two level nets after the asset need to be protected against a probing attack.

Note that the asset can be identified by the chip designer as a user input in an exemplary FIB-aware anti-probing physical design flow in accordance with embodiments of present disclosure, as shown in FIG. 2. If one of the assets is not identified in the user input, the target net identification metric would not be able to recognize the nets that can leak information of the unidentified asset. In addition, for those nets that might be utilized to infer asset information through a complicated mathematical analysis (e.g. the intermediate nets of an encryption/decryption process used in differential fault analysis (DFA) technique), such nets may not be covered by the target net identification metric. Thus, they may be declared in the user input as a special 'asset' to be protected against a probing attack.

One unique feature of an exemplary FIB-aware anti-probing physical design flow in accordance with embodiments of the present disclosure is the adoption of internal functional nets of an integrated circuit design as a shield to protect target nets within the integrated circuit design against a probing attack. In contrast, existing active shield countermeasures are vulnerable to bypass attacks and reroute attacks because the shield at the top-most layer is relatively easy to access and manipulate. In addition, more advanced existing active shields require cryptographically secure pattern generators, which themselves are sources of vulnerability and additional overhead. In contrast, utilizing internal functional nets in accordance with embodiments of the present disclosure provides the numerous advantages. First, an exemplary shield of the present disclosure is routed within internal layers of a chip and therefore is far more difficult to bypass and reroute. Second, the integrated circuit design itself will generate these signals (to be compared) alleviating the need for pattern generation, which reduces the major area overhead introduced by active shield pattern generation. In accordance with the present disclosure, a technique is developed for identifying which internal nets can be utilized as shield nets (covering nets) using various metrics.

For example, the target score metric can be used to identify shield nets in addition to target nets. Since the shield nets should not carry any asset information since they are not protected and could be probed, a target score that was used to identify target nets can be inverted to identify nets that carry the least sensitive information. Additionally, a toggle frequency metric can be used to identify shield nets that have a relatively high toggling rate so that an attacker cannot replace them with a constant value after cutting them. A switching probability metric can be used to identify nets that are balanced, since it should be difficult to predict the signals on shield nets (i.e., whether a signal on the net carries a 1 or 0). Further, a controllability metric can also be used to identify the shield net(s). For example, an attacker should not have control over the shield nets. Otherwise, the shield can be replicated with the controlled value, allowing the attacker to freely perform the attack. In various embodiments, the SCOAP controllability value can be used for the controllability metric and should be as high as possible. Next, a slack metric can be used, since chosen internal nets as shield nets should not impact the critical path delay and the design's performance. Thus, in accordance with embodiments of the present disclosure, shield nets are extended and moved to cover target nets, which may increase the timing of the paths that the shield net belongs to. Hence, chosen internal nets should not lie on critical paths.

For each of the aforementioned shield requirements, a threshold value of a corresponding metric may be determined to maximize the coverage on target nets and minimize the vulnerabilities and impacts from shield nets. In various embodiments, the final candidate shield nets will be the intersection of the five net collections which satisfy the threshold values for each shield requirement.

Figure 5:
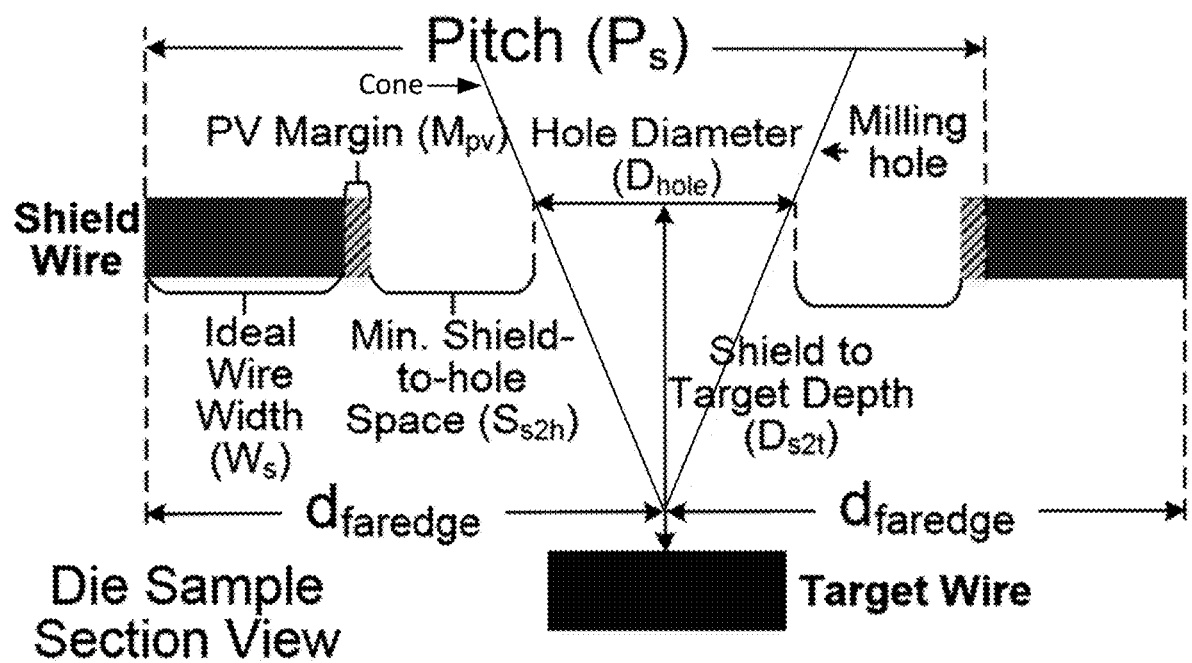
FIG. 5 illustrates a milling strategy used in a FIB physical probe attack against conventional shield technologies.

After appropriate shield nets are identified, the next step involves determining a metal layer in the chip layout to route the shield nets. In various embodiments, two types of shield structures are capable of being built: a single layer shield and a two layer parallel shield. For the single layer shield, a milling scenario using FIB technology may be deployed by an attacker, as shown in FIG. 5, where the solid bars are used to represent cross sections of metal wires on different routing layers. For the sake of argument, assume target wire (the bottom solid bar) in the figure is on layer n, shield wires (the top solid bars) are on layer n+q, and an attacker wishes to probe at one of the wires on the bottom target layer n to extract sensitive information. The hollowed out cone shown in the figure represents a cavity milled with FIB equipment.

One known exploit on active shields is to create a reroute between identified equipotential points by circuit editing with FIB, so that the net would not become open when parts of the wires are removed. This forces active shield designs to only use parallel wires with minimum spacing and widths to maximize the attack complexity, because the shield with elbows (snake-like) may create a short path for reroute with a long section of the shield wire disabled.

From a layout point of view, active or analog shield designers are interested in the scenario where the attacker would make a mistake and leave a detectable footprint. To minimize the effect of the milling process, the attacker is likely to place the milling cavity in the center of two adjacent shield wires as shown in FIG. 5. To avoid affecting the normal signal transmission of shield wires, the attacker will avoid completely or partially cutting any shield wires. Further, a minimum space ($S_{margin}$) is left between the shield wire and the milling cavity, as shown in FIG. 5, to minimize the effect of changed parasitic capacitance during the attack on the timing of shield wires. In order to account for the limitations of lithography and metallization as well, $S_{margin}$ is set to the same value with the minimum distance between metal wires as provided by the design rule of the technology. In addition, because of the process variation, the shield wires may be wider or thinner than the ideal wire width. Hence, to guarantee the minimum space between the shield wire and the milling cavity, an additional process variation margin ($M_{pv}$: typically 10% of the wire width) is added to the width of shield wire as shown in FIG. 5.

These restrictions create a maximal milling cavity diameter limit on a shield layer:

$$D_{cavity} < P_s - W_s - 2M_{pv} - 2S_{margin}$$

where $P_s$ is the pitch size of shield layer, $W_s$ is the ideal width of shield wires, $M_{pv}$ is the process variation margin of shield wires, and $S_{margin}$ is the minimal space between the shield wire and the milling cavity which can be determined by the minimal space between metal wires defined by technology design rules. The milling cavity diameter is determined by:

$$D_{cavity} = \frac{D_{s2t}}{R_{FIB}} \quad (4)$$

where $D_{s2t}$ is the depth from shield layer to target layer, $R_{FIB}$ is the aspect ratio of FIB, which is defined as the ratio between FIB depth $D_{s2t}$ and diameter Dhole as shown in FIG. 5. Therefore, the maximum FIB aspect ratio that the shield could protect against, which is termed as shield security, can be modeled as:

$$R_{FIB,max} = \frac{D_{s2t}}{P_s - W_s - 2M_{pv} - 2S_{margin}} \quad (5)$$

The higher the shield security ($R_{FIB,max}$) value is, the better the single layer shield is. The shield security can vary depending on shield layer, target layer, width of shield wire, and other layout technology parameters. Therefore, a different technology library might derive a different shield security and a different best shielding layer through Equation (5).

Table V (below) shows the shield security calculated from SAED32 nm library. As shown, shield layer 6 has the best shield security for target nets on layer 3 and 4, and is also good for target nets on layer 1 and 2. Although shield layer 4 is better than layer 6 for target nets on layer 1 and 2, in terms of shield security, shield layer 4 would require routing of all the target nets within only two layers (layers 1 and 2), which may cause serious routing congestion. Hence, layer 6 is chosen as the overall optimal shield layer by having excellent shield security and sufficient space available for routing of target nets for single layer shield designs.

TABLE V

| Max $R_{FIB}$ Target Layer | Shield Layer | | | | | | |
|---|---|---|---|---|---|---|---|
| | 9 | 8 | 7 | 6 | 5 | 4 | 3 | 2 |
| 8 | 0.46 | | | N/A | | | | |
| 7 | 0.86 | 0.64 | | N/A | | | | |
| 6 | 1.26 | 1.28 | 0.64 | N/A | | | | |
| 5 | 1.66 | 1.91 | 1.28 | 1.81 | N/A | | | |
| 4 | 2.06 | 2.55 | 1.91 | 3.61 | 1.81 | N/A | | |
| 3 | 2.46 | 3.19 | 2.55 | 5.42 | 3.61 | 4.41 | N/A | |
| 2 | 2.86 | 3.83 | 3.19 | 7.23 | 5.42 | 8.82 | 4.41 | N/A |
| 1 | 3.26 | 4.47 | 3.83 | 9.04 | 7.23 | 13.24 | 8.82 | INF |

Therefore, in an exemplary single layer internal shield implementation, shield nets can be routed on metal 6 and target nets can be routed under metal 4 (metal 4 included). Compared to the conventional active shield approach whose shield wires are routed on the top-most layer (metal 9), the shield security for the best case active shield (target on metal 1, shield on metal 9) is only 3.26, which is still less secure than the worst case internal shield on M6 (target on metal 4, shield on metal 6) whose shield security is 3.61. In addition, an internal shield routed on metal 6 is more resistant to reroute attack where a shield path is duplicated between two equipotential points, and bypass attack where the shield is bypassed by leveraging the space between adjacent shield wires, since the wires beyond or above the shield layer (layers 7, 8, and 9) become prominent obstacles to the attack.

Although shield security is a simple and useful metric to determine the best layer for a single layer shield, it might not be appropriate for multilayer shield structures, e.g. two-layer parallel shield. For example, adding an extra shield layer might not increase the maximum FIB aspect ratio that the shield can protect against, thereby resulting in the same shield security value. Although a multilayer shield might improve the protected ratio against a specific FIB (as long as this ratio is not 100%), the shield security will not be improved because it requires full protection. Therefore, to determine which layers are suitable for a two-layer parallel shield, a shield coverage metric is developed and used in various embodiments.

Figure 6:
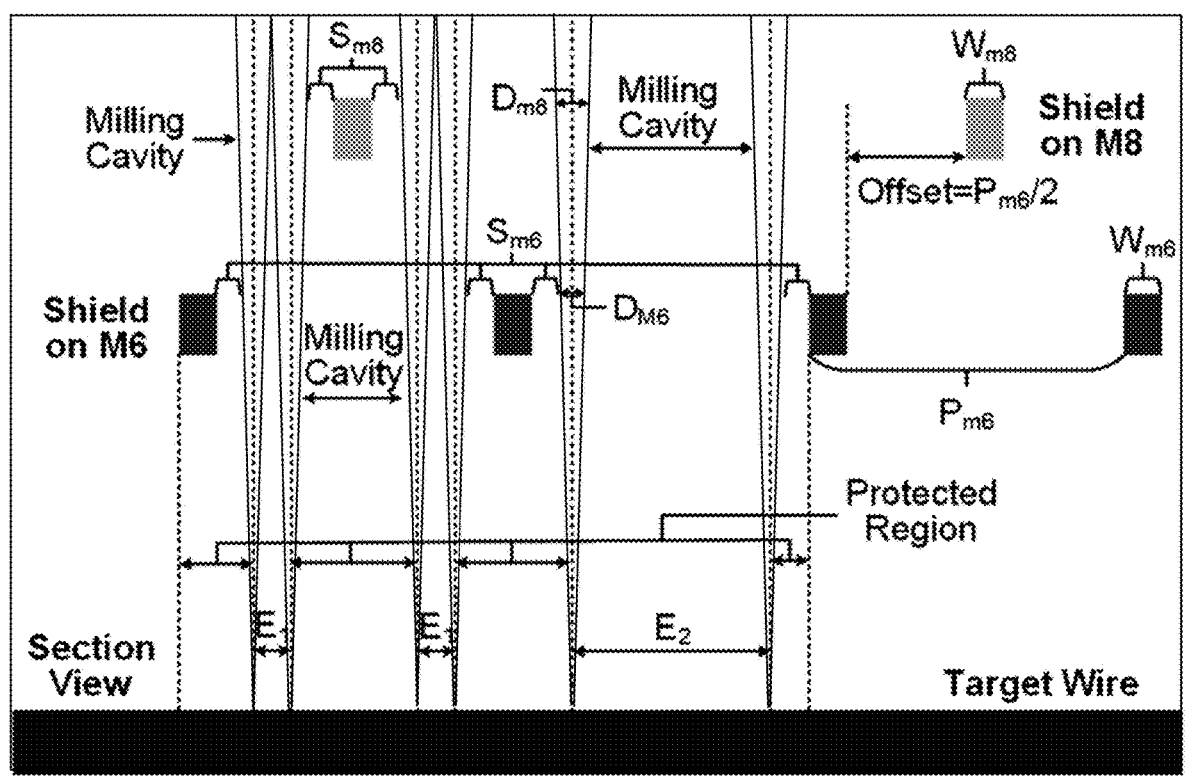
FIG. 6 illustrates a multilayer shield security in the form of a two layered staggered parallel shield in accordance with embodiments of the present disclosure.

Let's consider a two layer staggered parallel shield on M6 and M8 as shown in FIG. 6. The pitch size on M8 is twice the pitch size of M6 as defined in SAED32 nm library, and they have 50% offset to maximize the protection. The shield coverage is defined as:

$$\text{Coverage} = \frac{\text{Protected Region}}{\text{Period}} = \frac{\text{Period} - \text{Exposed}}{\text{Period}} \quad (6)$$

In which the Period is the pitch size of the upper shield layer ($P_{m8}$) because typically an upper layer has larger pitch size than a lower layer. The Exposed metric is the region on the target wires that is free to probe without triggering a shield alarm, which can be calculated as:

$$\text{Exposed} = 2 \times E_1 + \left(\frac{P_{upper}}{P_{lower}} - 1\right) \times E_2 \quad (7)$$

where $P_{upper}$ and $P_{lower}$ are the pitch size of the upper shield layer and the lower shield layer ($P_{m8}$ and $P_{m6}$ in FIG. 6), $E_1$ and $E_2$ are two types of exposed regions as shown in FIG. 6) and are defined as:

$$E_1 = \tfrac{1}{2}P_{lower} - \tfrac{1}{2}(W_{upper} + W_{lower}) - (S_{lower} + S_{upper}) - \tfrac{1}{2}(D_{upper} + D_{lower}) \quad (8a)$$

$$E_2 = P_{lower} - W_{lower} - 2S_{lower} - D_{lower} \quad (8b)$$

where $W_{upper}$ and $W_{lower}$ are the metal width of the upper shield layer and the lower shield layer ($W_{m8}$ and $W_{m6}$), $S_{upper}$ and $S_{lower}$ are the space between the shield wire and the milling cavity ($S_{m8}$ and $S_{m6}$ which can be determined by the minimal metal space defined by the technology design rules), and $D_{upper}$ and $D_{lower}$ are the milling cavity diameters on the upper shield layer and the lower shield layer ($D_{m8}$ and $D_{m6}$) which can be calculated using Equation (4). In general, the higher the shield coverage, the better the two-layer parallel shield design.

Figure 7:
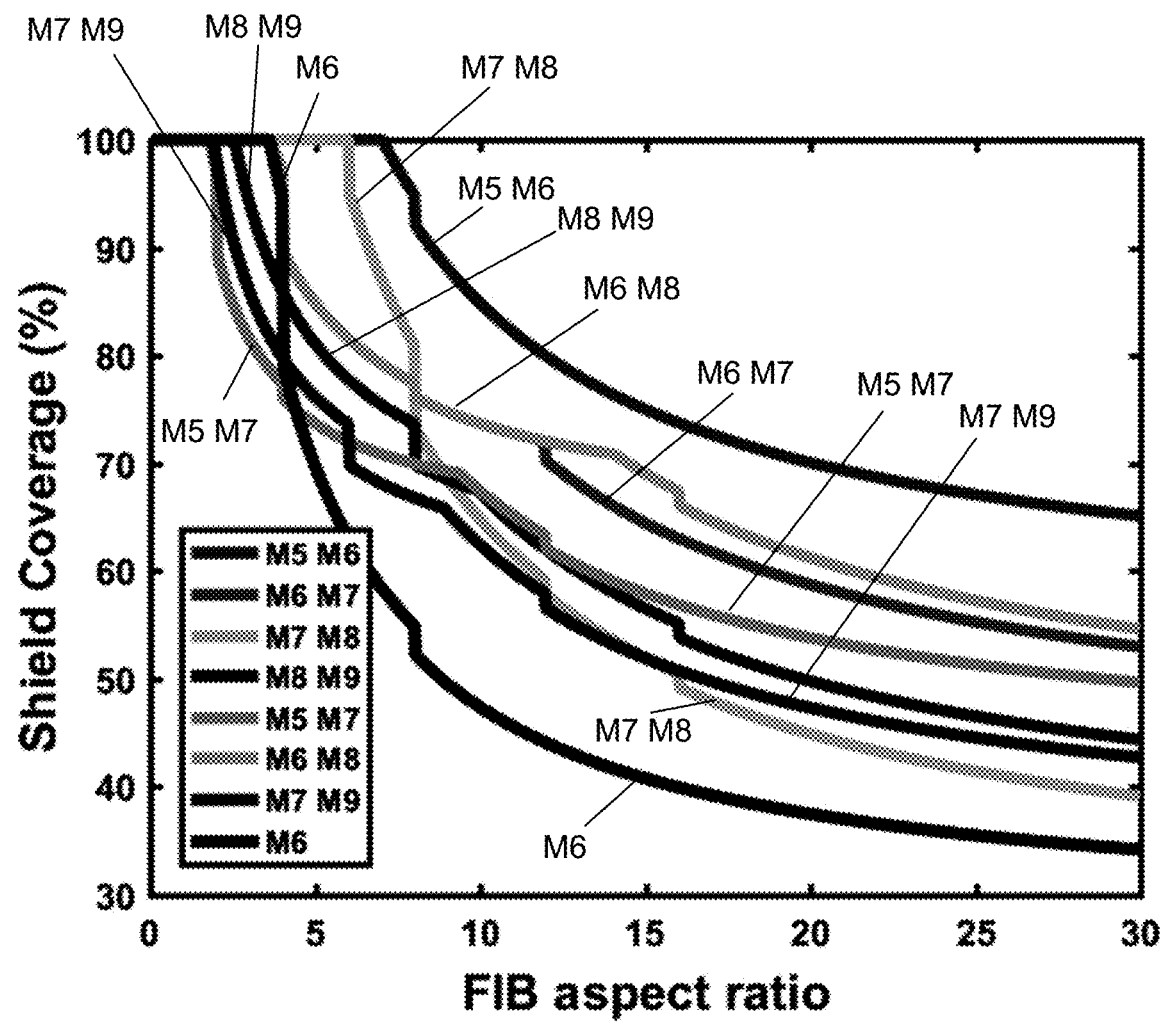
FIG. 7 illustrates shield coverages of different two-layer staggered parallel shield designs using SAED32 nm library in accordance with embodiments of the present disclosure.

As illustrated in Equations (7) and (8), the shield coverage depends on many factors defined by the technology and the selection of shield and target layers. FIG. 7 represents the shield coverage of different two-layer staggered parallel shield designs using SAED32 nm library. From the figure, we can see that two-layer shield designs perform better than the single layer shield on the M6 design (bottom curve) especially when $R_{FIB}$ is high. Although the two-layer shield on M5 and M6 (top curve) is theoretically optimal for shield coverage, as a practical issue, routing congestion is an issue due to the small pitch size on M5. Therefore, the shield on M6 and M8 (second best in shield coverage) may be best-suited due to practical considerations.

Figure 8A:
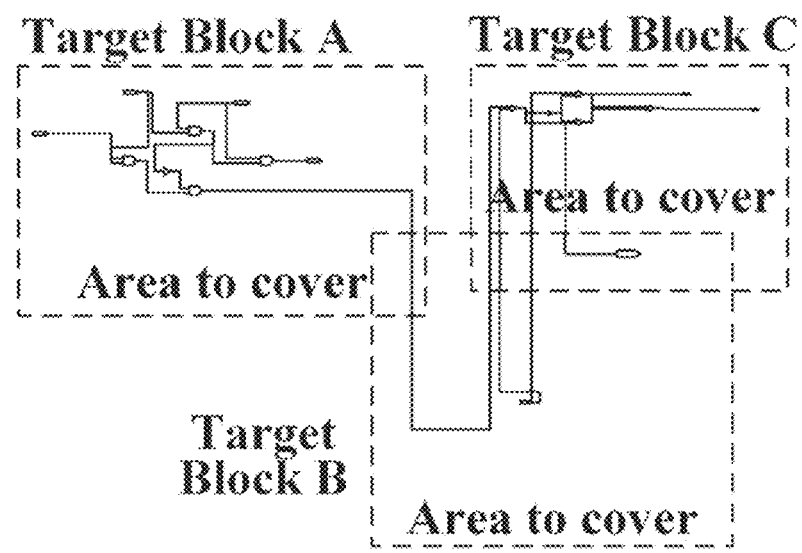
FIGS. 8A-8D illustrate floorplanning techniques for placement of target nets, shield nets, and a comparator within an integrated circuit device design in accordance with embodiments of the present disclosure.
Figure 8B:
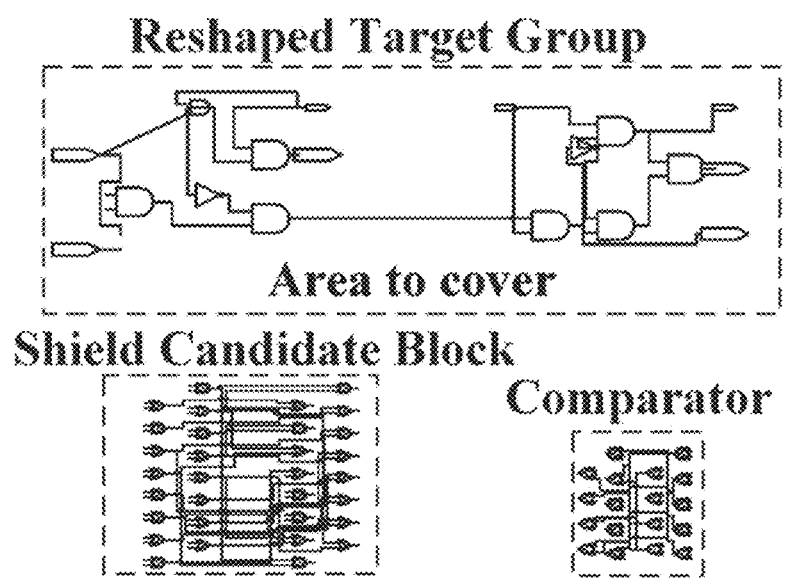

In conventional design flows, CAD tools perform floorplanning to optimize timing, power, and area. In an initial design as shown in FIG. 8A, target nets and the blocks containing them are distributed randomly throughout the design. It is neither easy nor efficient to protect them with such placement. It might also require more shield nets than available. A more advantageous approach is to constrain the target nets into a regularly shaped region, e.g., a single rectangle, as shown in FIG. 8B. This can be implemented by enumerating all gates connected to target nets, and then creating a floorplan group to constrain their relative placements. The location of this floorplan group can be chosen to remain as close to its original placement to reduce the impact on performance. The optimal dimensions of this floorplan group can be found by extracting all gates and nets involved into a sub-layout where only these gates and nets are placed and routed.

Figure 8C:
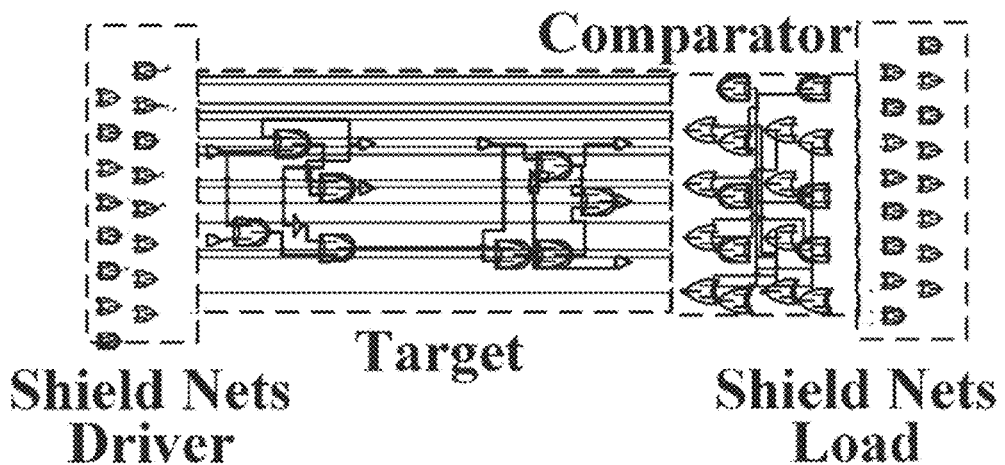
Figure 8D:
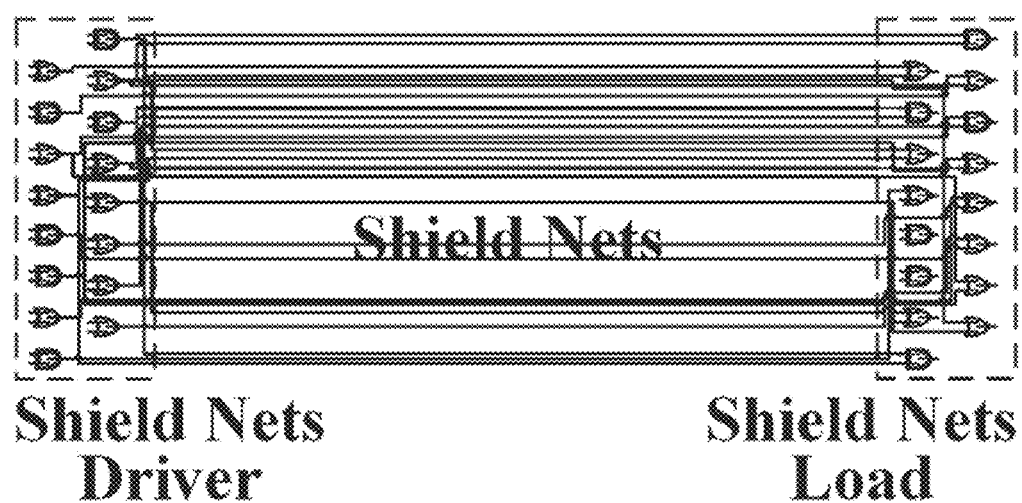

A comparator may then be used to detect an attack by comparing a shield signal from an upper layer and another copy from a lower layer of an integrated circuit design. Accordingly, the comparator nets may also be protected like the target nets, because otherwise if the comparator nets are tampered to maintain a static value, the testability of the shield nets will be compromised. Hence, in exemplary embodiments, the comparator gates are constrained in a floorplan group besides the target block as shown in FIG. 8C. Further, unlike target nets, gates connected to shield nets are divided into two separate floorplan groups: shield nets driver group and shield nets load group as shown in FIG. 8D. An exemplary shield net identification metric ensures that the performance overhead due to the constrained floorplanning is minimal. Both shield nets driver group and load group are constrained at opposite ends of the expected shielding area (target and comparator block), as shown in FIG. 8C, so that routing of shield nets crosses the target area and provides vertical protection from milling/probing. In various embodiments, the shield nets load group can be placed at the comparator's side so that the received signals from the shield nets are compared in the comparator.

Figure 9:
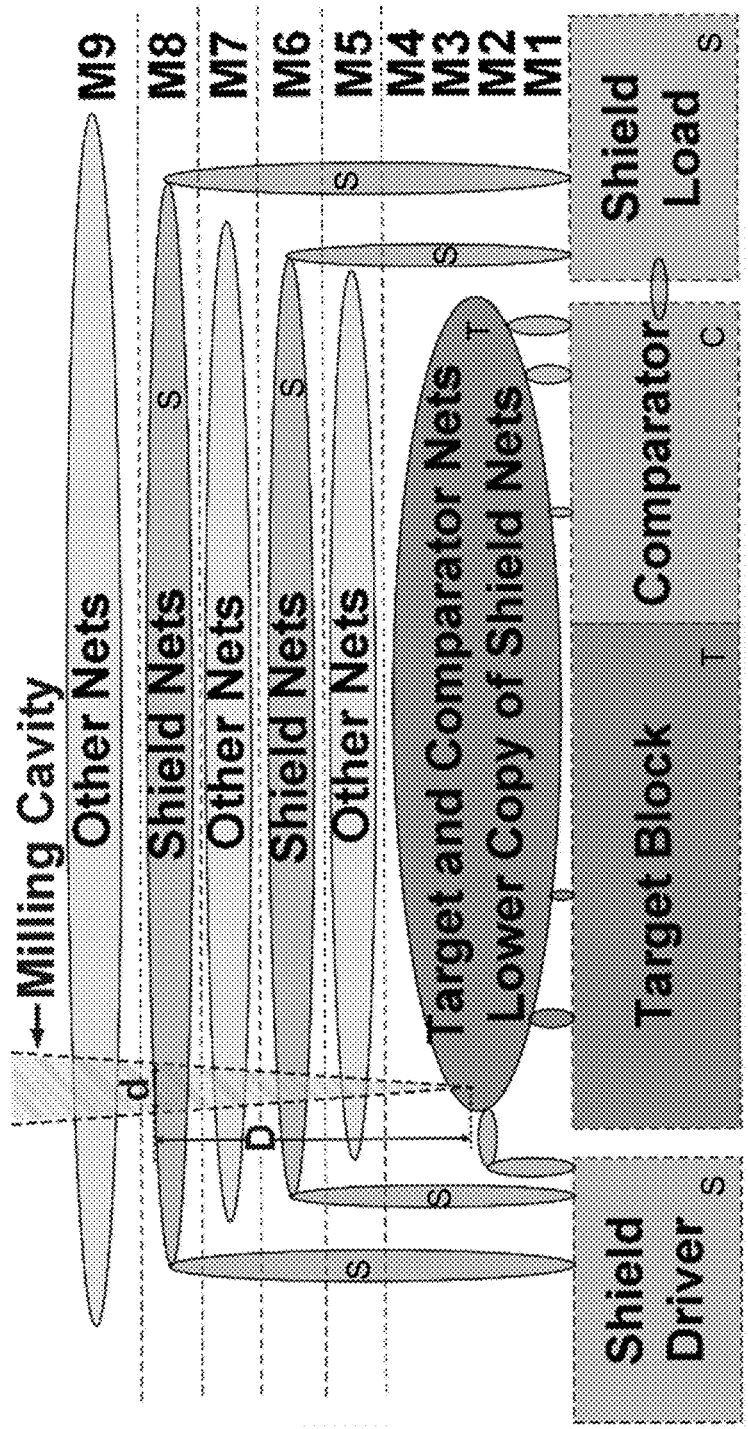
FIG. 9 illustrates routing layer constraints for target and shield nets in an exemplary embodiment of the present disclosure.

In addition to creating floorplanning constraints, wire-routing constraints are also utilized to protect the integrated circuit device against probing attacks with a large aspect ratio FIB. An aspect ratio of an FIB is defined as the ratio between depth D and diameter d of a milled cavity, as shown in FIG. 9, and is an important measure of FIB performance. A larger aspect ratio results in a milling cavity of smaller diameter on the top-most exposed layers, and therefore has less impact on the protective circuitry. Routing target nets in the lower layer can also lead to increased protection from other non-shield internal function nets in the design. In one illustrative embodiment, shield nets are routed on M6 (M9 is the top layer) for a single layer shield design, route shield nets are routed on M6 and M8 for a two-layer parallel shield design, and route target nets and comparator nets are routed under M4 (M4 included) to obtain an optimal protection, as shown in FIG. 9. Further, another copy of shield nets can also be routed under M4 to be compared with the genuine shield nets on the upper layer(s).

Although pre-existing techniques have proposed an exposed area metric by assuming that a complete cut of one shield wire is required for the detection of the attack, this approach is too conservative in several aspects. The first is assuming that only a complete cut of the shield wire will be sufficient for detection of the probing attack. In reality, as soon as a minimum cross section of a cut shield wire is violated, the attack is likely detected by an active shield. Further, even if the milling cavity does not touch the shield wires, the changed parasitic capacitance, due to the close distance between the shield wires and the milling cavity, may trigger the alarm of an active shield by affecting the timing of shield wires. Thus, a more realistic model for detection of a probing attack is shown in FIG. 5, where the probing attack can be detected if the center of milling exists within $d_{faredge}$ from the far edge of the shield wire:

$$d_{faredge} = \frac{D_{s2t}}{2R_{FIB}} + W_s + S_{margin} + M_{pv} \quad (9)$$

Thus, Equation (9) shows the possibility of finding the area in which the milling center should not reside and is referred as the milling exclusion area (MEA). Correspondingly, the desired exposed area (EA) will be its complement projected on the target layer.

Figure 10:
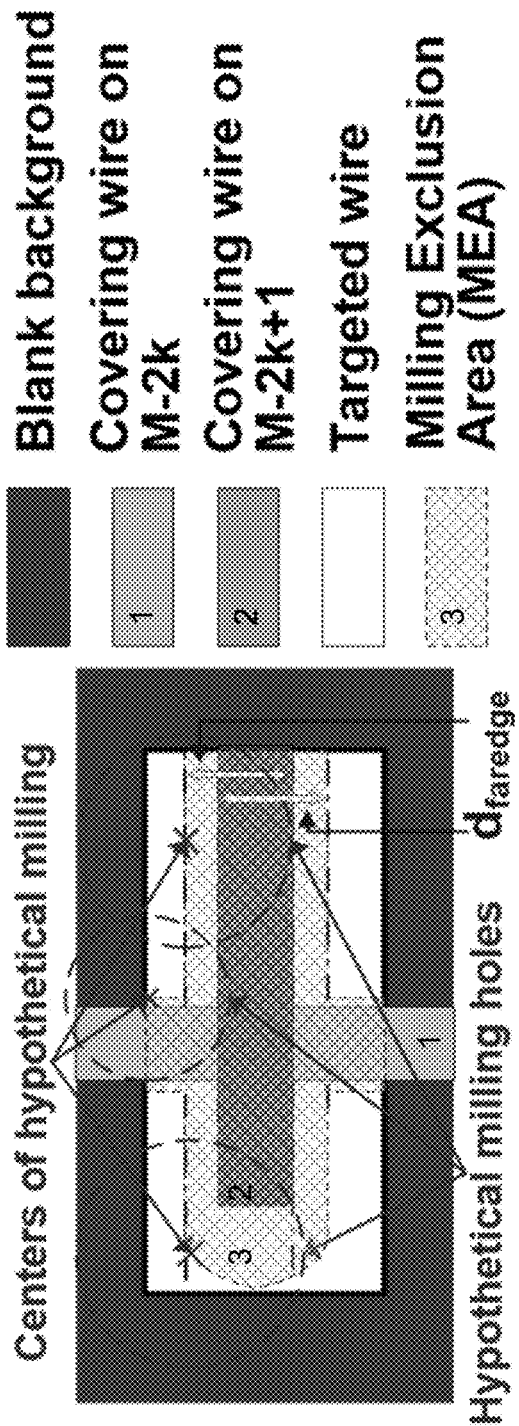
FIG. 10 illustrates a technique for determining which areas in an integrated circuit design are subject to a probing attack without detection in accordance with embodiments of the present disclosure.

FIG. 10 shows how the exposed area (EA) can be found for any given target wire and covering shield wires on higher layers which are capable of projecting the milling exclusion area. Assuming the white region is the targeted wire at a lower layer of a layout and the vertical ("1") and horizontal ("2") shaded regions are the covering wires at upper layers above the targeted wire, the outer horizontal region ("3") is the milling exclusion area (MEA), which indicates that if the milling center falls in this area, then the probing attack will be detected. Hence, the complement area of MEA is the desired exposed area that will not cause any risk to be detected. The exposed area can vary according to the different aspect ratios of the FIB, since the diameter of the cavities milled by an FIB with different aspect ratios is different. For example, a larger exposed area in the design is more vulnerable to probing attacks.

To evaluate how efficient an exemplary FIB-aware anti-probing physical design flow can be and how much area in the design is vulnerable to probing attacks, layouts of Advanced Encryption Standard (AES) and Data Encryption Standard (DES) crypto-cores may be used. For evaluation purposes, the DES and AES modules are from OpenCores and are described in register-transfer level (RTL) code and synthesized using Synopsys Design Compiler with Synopsys SAED 32 nm technology library. The layout of AES and DES modules are generated and constrained using Synopsys IC Compiler. The asset in the AES and DES modules is taken to be the encryption key (128 bits for AES and 56 bits for DES), which is hardcoded in the design. The previously illustrated target score metric (e.g. Table IV) can be used to identify the probing target nets in the AES and DES modules.

Figure 11:
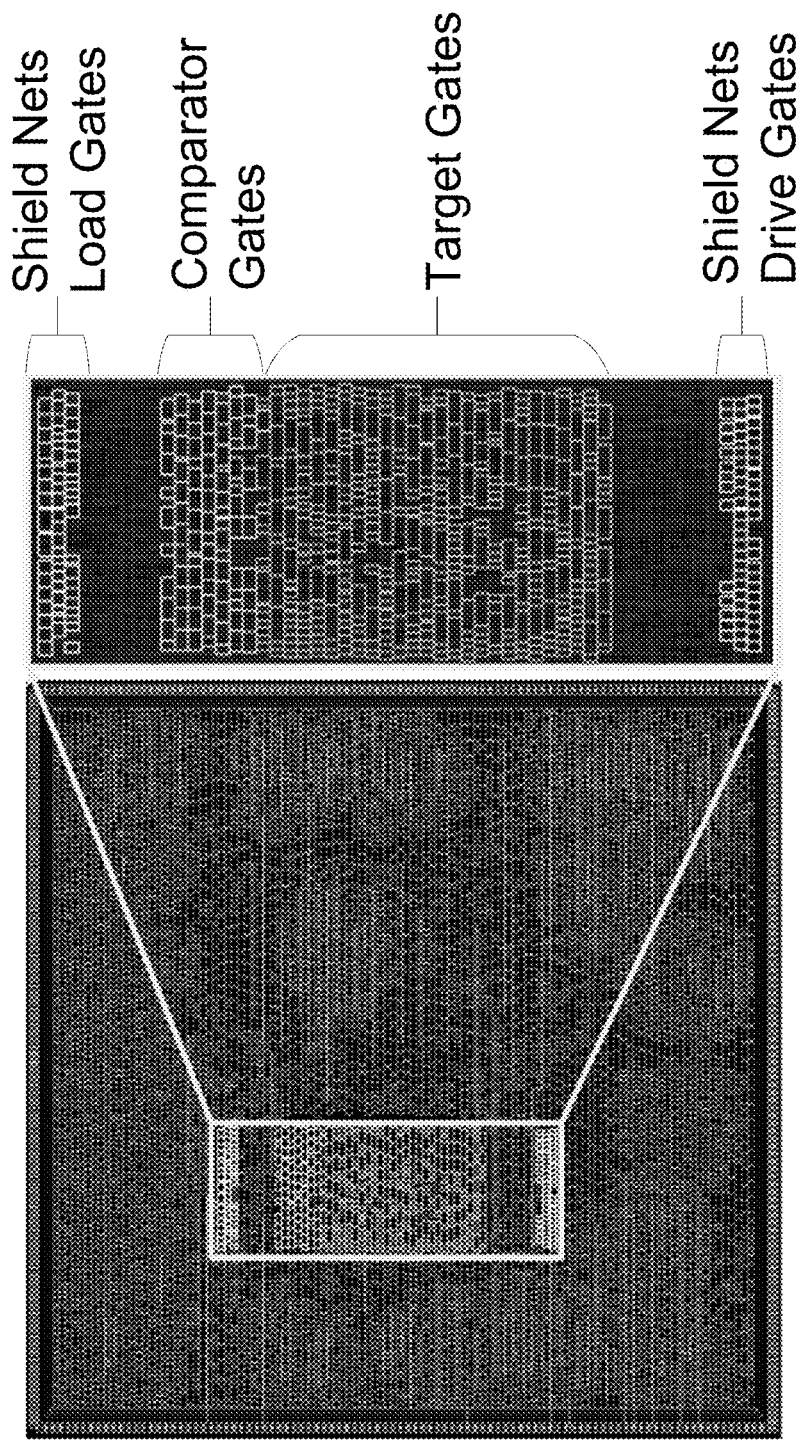
FIG. 11 illustrates grouped and reshaped target gates, comparator gates, and shield gates in AES and DES designs in accordance with embodiments of the present disclosure.

When the target score threshold value is set to 0.125 (target score for asset net is 1, for non-asset net is 0), nets within two levels after the asset nets are identified as probing target nets. Hence, 384 nets for AES and 200 nets for DES including key nets are probing target nets in the two designs. Next, gates connected to target nets are grouped and reshaped into a rectangular target block as shown in FIG. 11. In addition, a 64-bit comparator is inserted in the AES and DES designs, and comparator gates are grouped and reshaped into a rectangular block besides the target gates block, as also shown in FIG. 11.

Table VI (below) shows the metrics and threshold values used to identify shield nets in AES module to cover the target block, in accordance with an embodiment of the present disclosure, in which the Min. and Max. columns show the minimum and maximum value measured in the design for each metric and the Best column indicates the optimal value for a shield net for each metric. The optimal value for the metric of shield nets are the minimum values of target score and delay slack and maximum values of Togg. Rate, CC0, and CC1. The Percentage column presents the percentage of all nets that are picked for each metric. The Threshold column indicates the threshold values for each metric, which are determined to offer a balanced trade-off between security and overhead. Hence, 136 nets in AES module and 118 nets in DES module, which meet all requirements of shield metrics, are identified as shield candidate nets for both designs.

TABLE VI

| Metric | Min. | Max. | Best | Percentage | Threshold |
|---|---|---|---|---|---|
| target score | 0 | 1 | 0 | 80% | <0.001 |
| Togg. Rate | 0 | 0.06 | 0.06 | 40% | >0.0187 |
| Delay Slack | 0.01 | 1.60 | 0.01 | 40% | <1.23 |
| CC0(SCOAP) | 0 | 2532 | 2532 | 40% | >395 |
| CC1(SCOAP) | 0 | 2081 | 2081 | 40% | >332 |
| Probability | 0 | 1 | 0.5 | 40% | 0.22~0.78 |

Figure 12A:
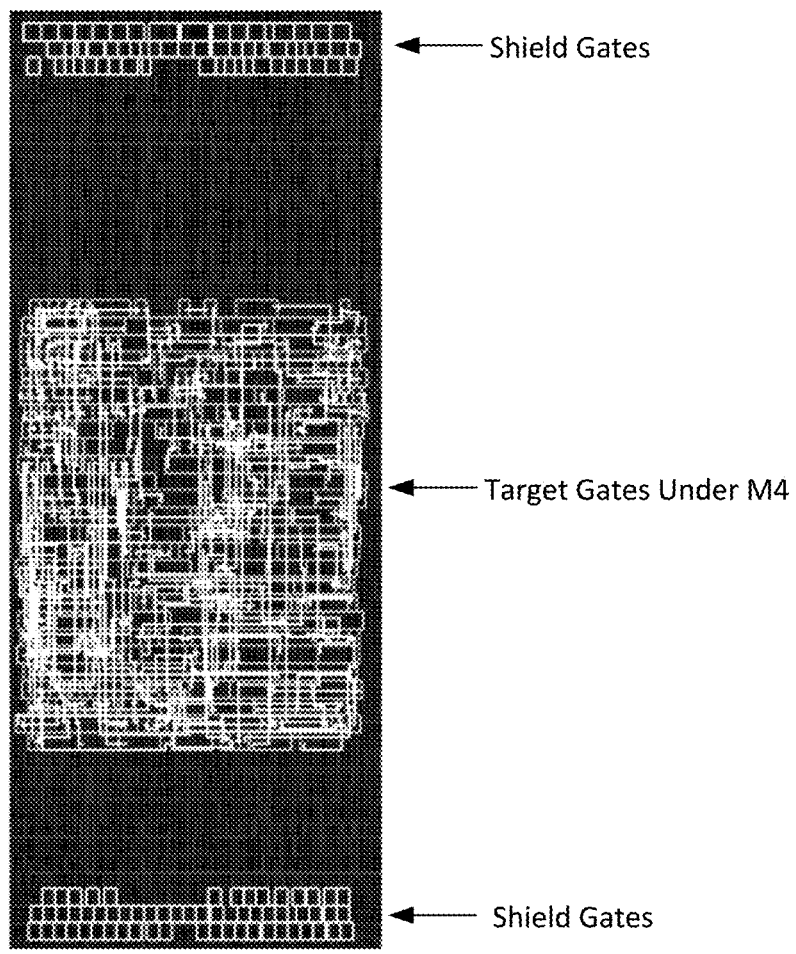
FIG. 12A illustrates the routing of target nets under an M4 metal layer within an embodiment of an integrated circuit device design having a single layer internal shield design in accordance with the present disclosure.
Figure 12B:
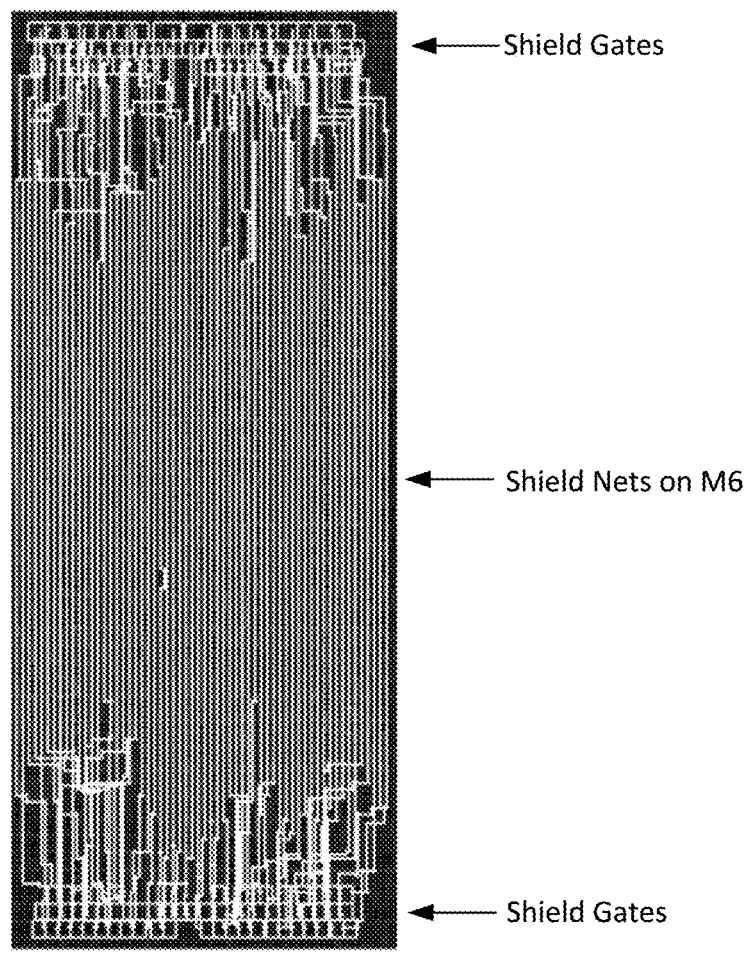
FIG. 12B illustrates the routing of shield gates on an upper M6 metal layer of the integrated circuit device design of FIG. 12A.
Figure 12C:
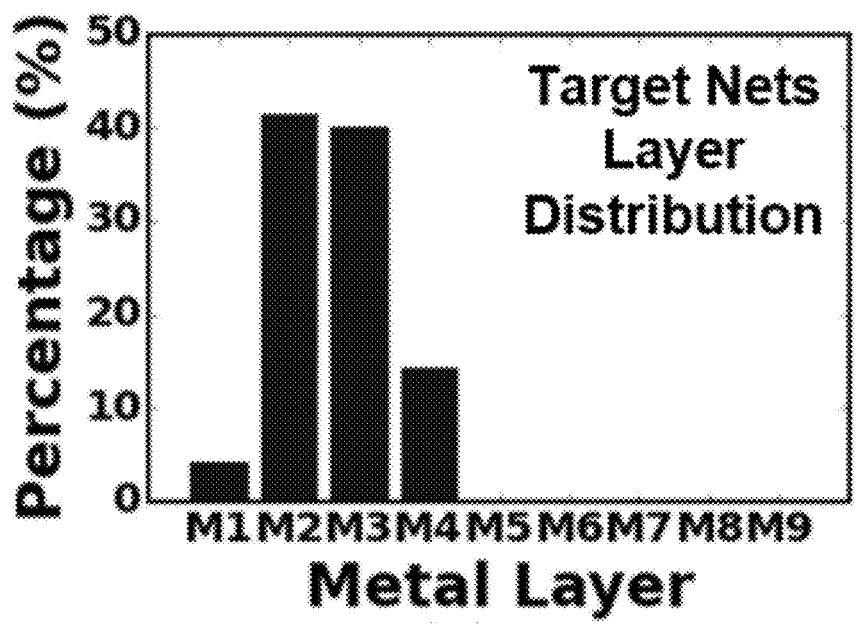
FIGS. 12C-12D present graphs illustrating a respective target nets layer distribution and a shield nets layer distribution with the integrated circuit device design of FIGS. 12A-12B.
Figure 12D:
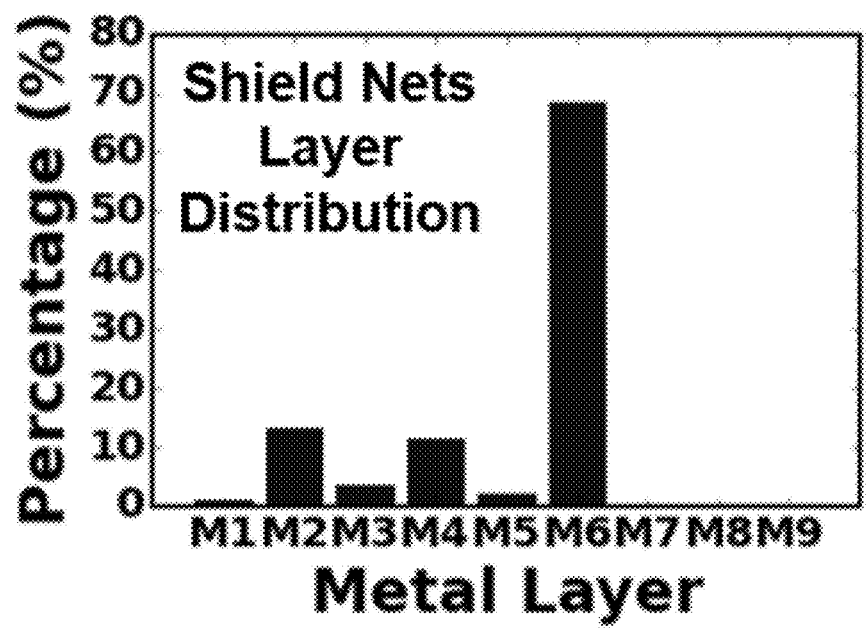

The final number of shield nets used for building the internal shield depends on the area on the chip or integrated circuit device that needs to be protected against a probing attack and the structure of the shield (single layer or two-layer). In an exemplary implementation, 64 and 56 shield nets are used to build the single layer internal shield for AES and DES respectively. Therefore, in the AES module, 64 driver gates and 64 load gates connected to the shield nets are reshaped into two groups respectively and placed at the opposite ends of target and comparator block, as shown in FIG. 11. Next, FIG. 12A shows the routing of target nets under M4, FIG. 12B shows the routing of shield nets on M6, and FIGS. 12C-12D show graphs of their layer distribution in the AES layout. Target nets, comparator nets, and shield nets copy are constrained in the reshaped target and comparator block and routed under M4, as previously discussed with respect to FIG. 9. Most shield nets are routed on M6 to provide optimal coverage.

Figure 13A:
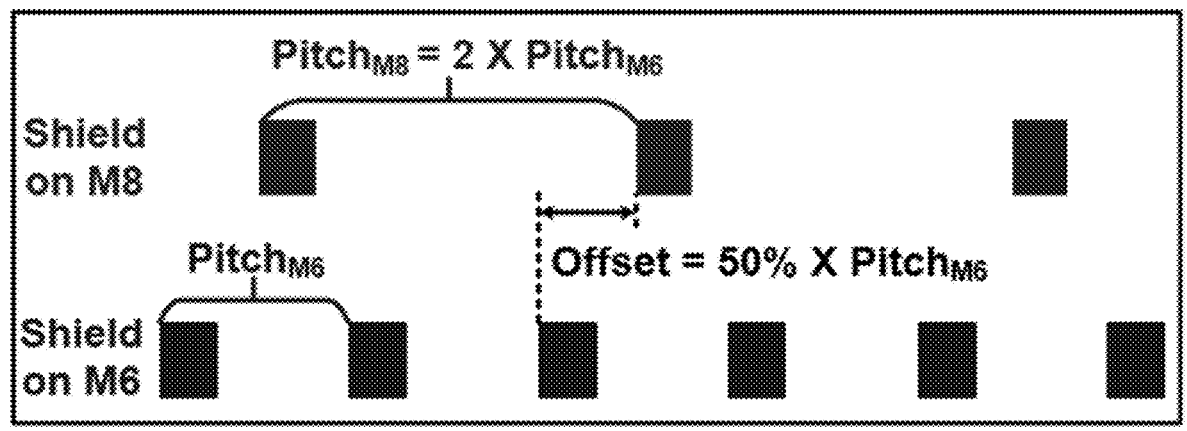
FIG. 13A illustrates an exemplary two-layer staggered shield on M6 and M8 of an integrated circuit device design in accordance with embodiments of the present disclosure.
Figure 13B:
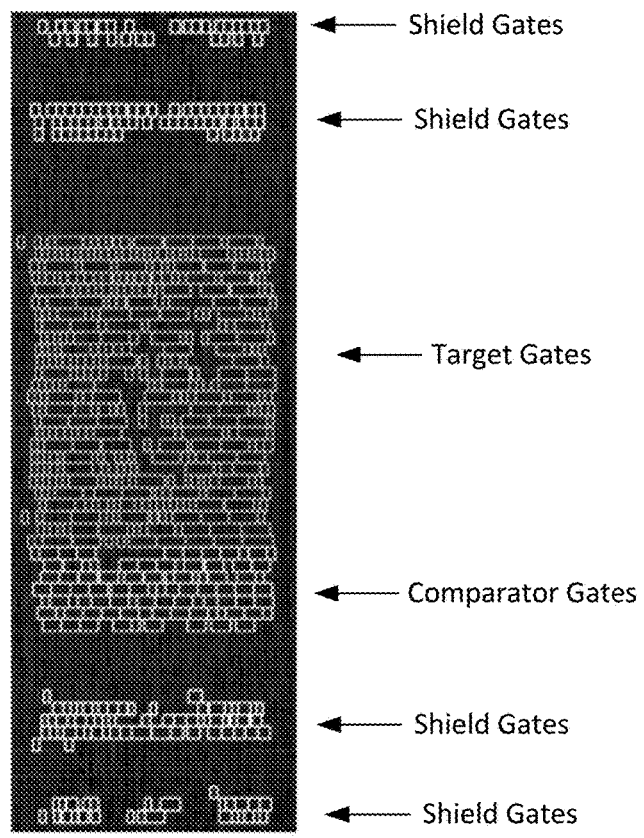
FIG. 13B illustrates a placement of target gates, comparator gates, and shield gates within the integrated circuit device design of FIG. 13A.
Figure 13C:
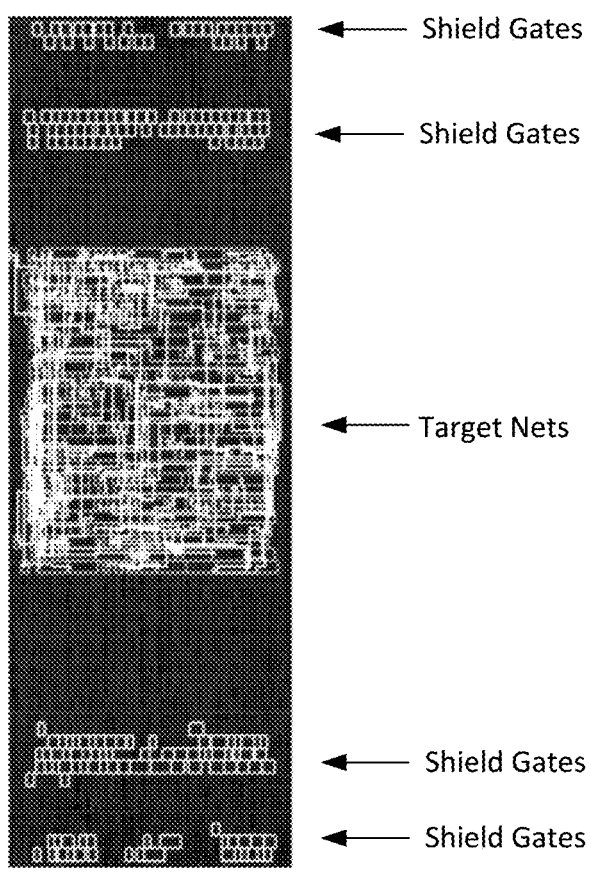
FIG. 13C the routing of target nets on the integrated circuit device design of FIG. 13A.
Figure 13D:
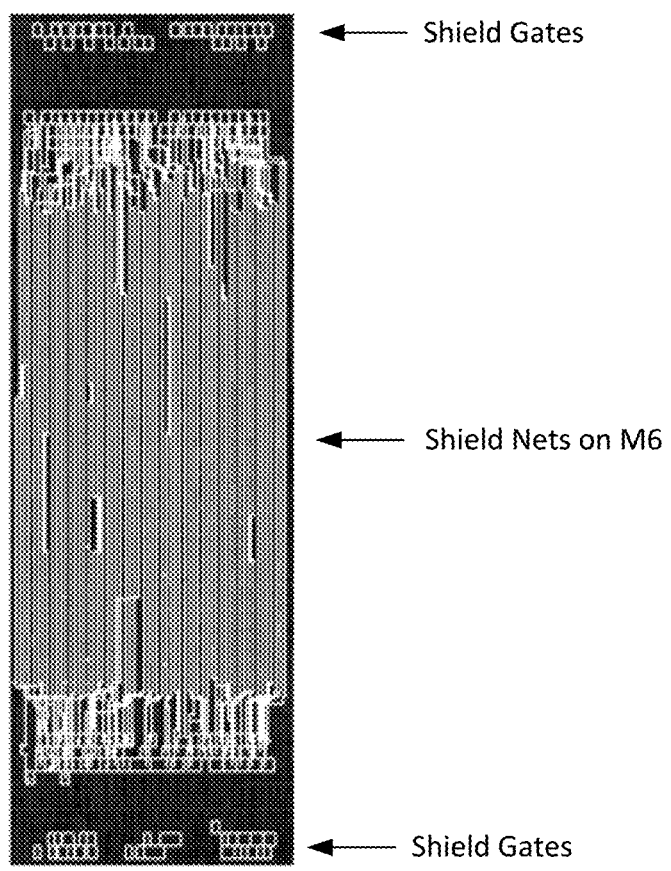
FIGS. 13D-13E illustrates the routing of shield gates on respective M6 and M8 metal layers of the integrated circuit device design of FIG. 13A.
Figure 13E:
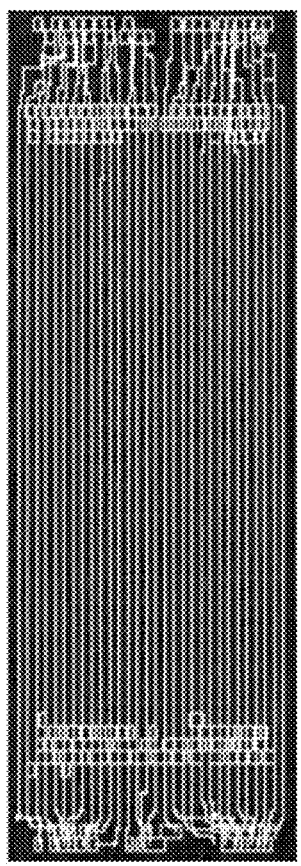

In addition to the single layer internal shield design, two-layer staggered parallel shield, which utilizes two routing layers to build the parallel shield with some offset between different layers, can provide enhanced protection. FIG. 13A shows an example of a two-layer staggered shield on M6 and M8. In this example, the pitch size on M8 is two-times the pitch size on M6 in SAED32 nm library, which results in that the shield density on M8 being half of the shield density on M6. A 50% offset is set between the shield wires on M6 and M8 to maximize the protection. Next, FIG. 13B shows the placement of target gates, comparator gates, and shield gates. FIGS. 13C-13E show the routing of target nets, shield nets on M6, and shield nets on M8 respectively.

Figure 14A:
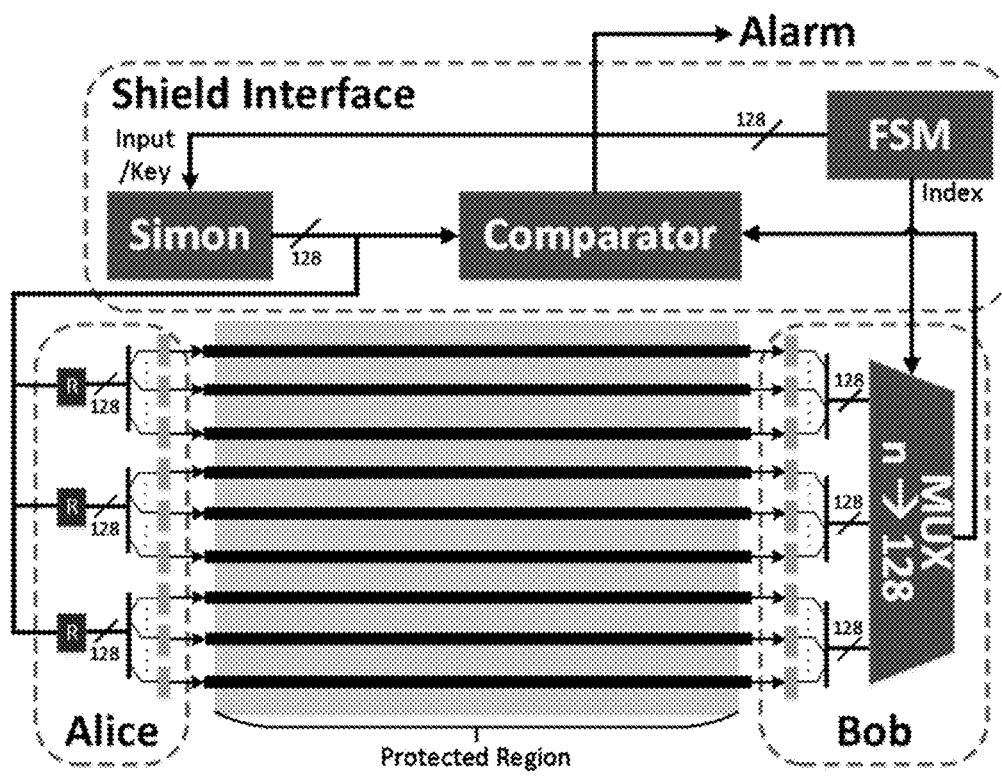
FIGS. 14A-14B respectively show a diagram of the conventional active shield and the layout of the implemented active shield anti-probing designs in accordance with the present disclosure.
Figure 14B:

Besides the baseline single layer shield design and two-layer parallel shield design, various embodiments also implement four additional designs for AES and DES respectively that also help to show the high efficiency of an exemplary FIB-aware anti-probing physical design flow. Table VII (below) shows the description of the six different designs for AES and DES. First, Design No. 1 is an initial design (FIG. 8A) using a conventional placement and routing flow without any protection against a probing attack. Design No. 2 is the baseline single layer shield design (FIG. 8B) on M6. Design No. 3 decreases the target score threshold from 0.125 to 0.01, which involves more target nets being protected under the internal shield. For Design No. 4, common fault injection target nets are included in the asset declaration, so that the nets vulnerable to fault injection attack are also protected under the shield. Next, Design No. 5 is the two-layer staggered parallel shield as shown in FIG. 13A, and Design No. 6 is a conventional active shield design with a lightweight Simon cipher inserted as the shield signal pattern generator, where FIGS. 14A-14B respectively show a diagram of the conventional active shield and the layout of the implemented active shield on AES.

| No. | Design | Notes |
|---|---|---|
| 1 | Original Design | Conventional physical design flow |
| 2 | Single layer Shield I | Single layer shield on M6 |
| 3 | Single layer Shield II | Decrease target score threshold to 0.01 |
| 4 | Single Layer Shield III | Includes nets of fault injection position in the Asset |
| 5 | Two-layer Parallel Shield | Two-layer shield on M6 and M8 |
| 6 | Active Shield | Conventional active shield design |

Table VIII (below) shows the timing, power, area and routing overhead of these six designs compared to the original AES and DES without any constraints. As observed from the table, the overhead of the baseline single layer shield (Design No. 2) is less than 3% for both AES and DES in timing, power, and area. In addition, the timing, power, and area overhead of the internal shield approaches (Design Nos. 2-5) are all less than 6% even with lower target threshold (Design No. 3) or including fault injection target nets (Design No. 4), which indicates that even if the security standard is increased to protect more sensitive nets against a probing attack, the overhead is still acceptable and not increased too much. Further, if considering the overhead to an SoC, this amount of overhead can be completely ignored since AES or DES module is just a very small portion in an SoC. In contrast, the conventional active shield approaches (Design No. 6) have ~400% overhead in power, area, and routing, which is much larger than the exemplary internal shield designs, because these conventional approaches require the insertion of a shield signal pattern generator and other supporting circuitry, e.g. FSM.

TABLE VIII

| Module | Design | Timing | Power | Area | Routing |
| --- | --- | --- | --- | --- | --- |
| AES | 2 | 0.32% | 2.79% | 0.74% | 11.60% |
| AES | 3 | 0.66% | 3.66% | 3.02% | 14.80% |
| AES | 4 | 0.66% | 6.03% | 3.17% | 22.99% |
| AES | 5 | 0.34% | 4.90% | 1.44% | 17.77% |
| AES | 6 | 3.95% | 439.83% | 402.31% | 407.40% |
| DES | 2 | 1.18% | 0.75% | 0.51% | 10.39% |
| DES | 3 | 4.55% | 1.38% | 0.50% | 13.41% |
| DES | 4 | 4.55% | 1.67% | 0.80% | 21.16% |
| DES | 5 | 1.18% | 2.83% | 1.78% | 20.85% |
| DES | 6 | 3.64% | 365.17% | 413.91% | 556.54% |

Figure 15A:
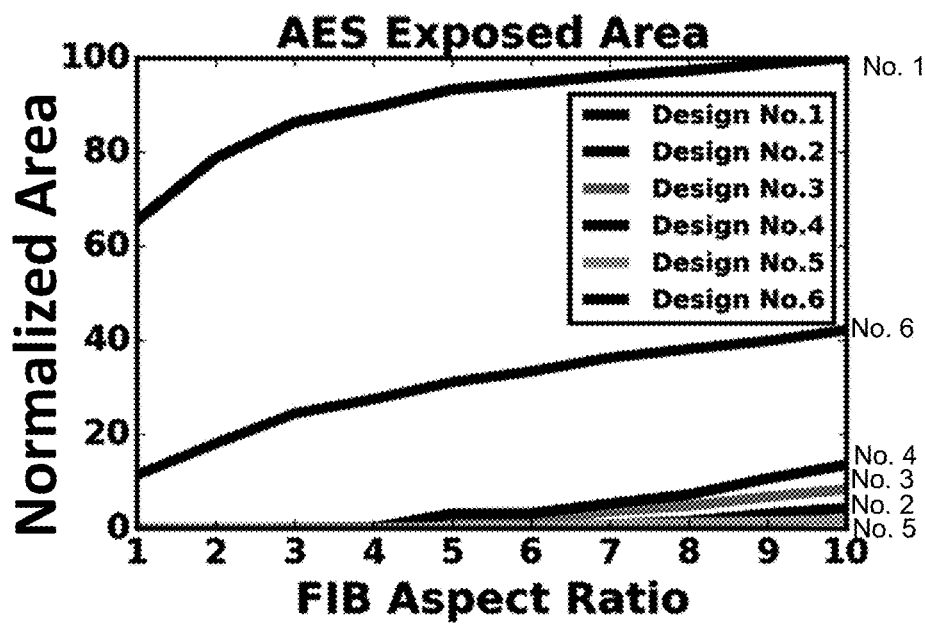
FIGS. 15A-15B are graphs respectively showing a normalized exposed area of six design types for AES and DES that include exemplary embodiments (Designs 2-5) of the present disclosure.
Figure 15B:
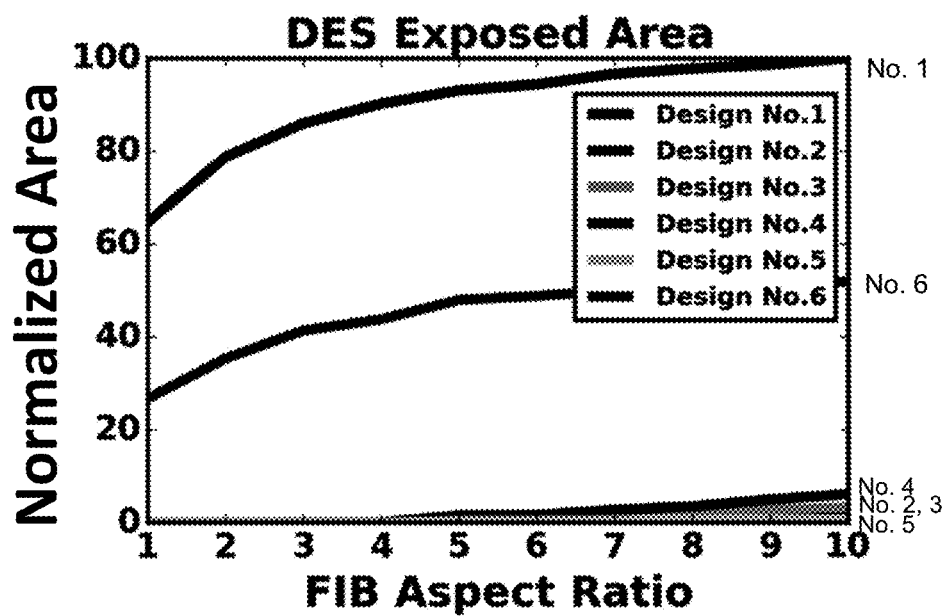

An exemplary internal shielding approach against probing attack is evaluated by the exposed area metric illustrated in Equation (9). FIGS. 15A-15B are graphs showing the normalized exposed area of all types of designs in Table VII for AES (FIG. 15A) and DES (FIG. 15B). The exposed area is calculated across the FIB aspect ratio from 1 to 10. From Equation (9), as the FIB aspect ratio increases, the exposed area for all designs will also increase since $d_{faredge}$ decreases with larger FIB aspect ratio, which results in a smaller milling exclusion area (MEA) and thus a larger exposed area (EA). By using an exemplary FIB-aware anti-probing physical design flow, the exposed area of all internal shield designs (Design Nos. 2-5) can be reduced to 0 for both AES and DES when the FIB aspect ratio is low. Even with an advanced FIB (e.g., aspect ratio is 10), the exposed area of the baseline single layer shield (Design No. 2) and the two-layer shield (Design No. 5) can be reduced at least to 5% and 2%, respectively, for both AES and DES.

Figure 15C:
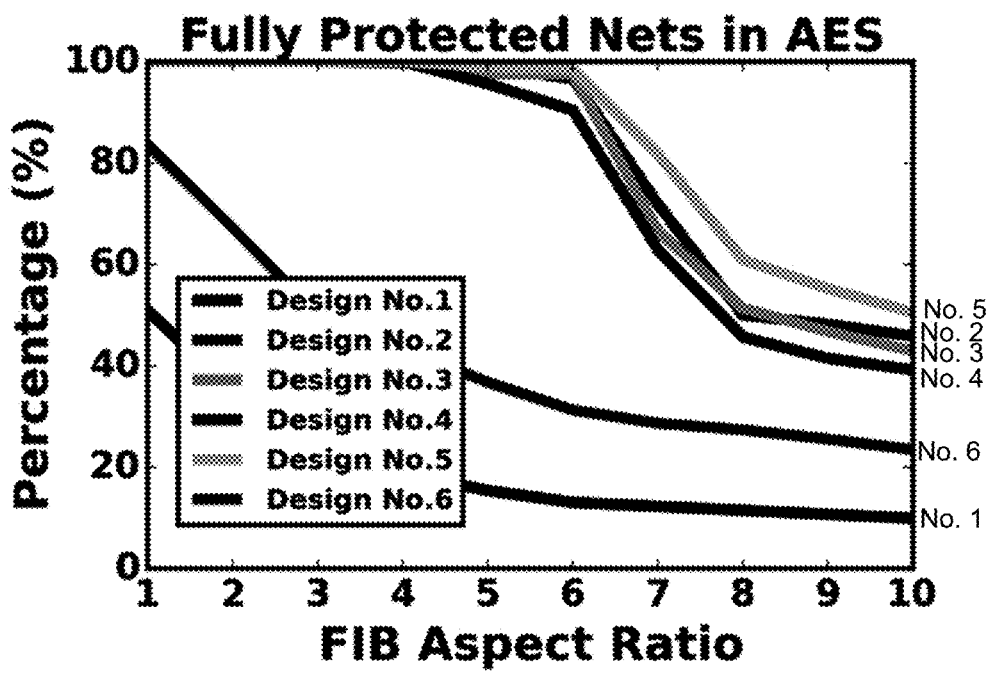
FIGS. 15C-15D are graphs respectively showing the percentage of fully protected target nets for six design types for AEA and DES that include exemplary embodiments (Designs 2-5) of the present disclosure.
Figure 15D:
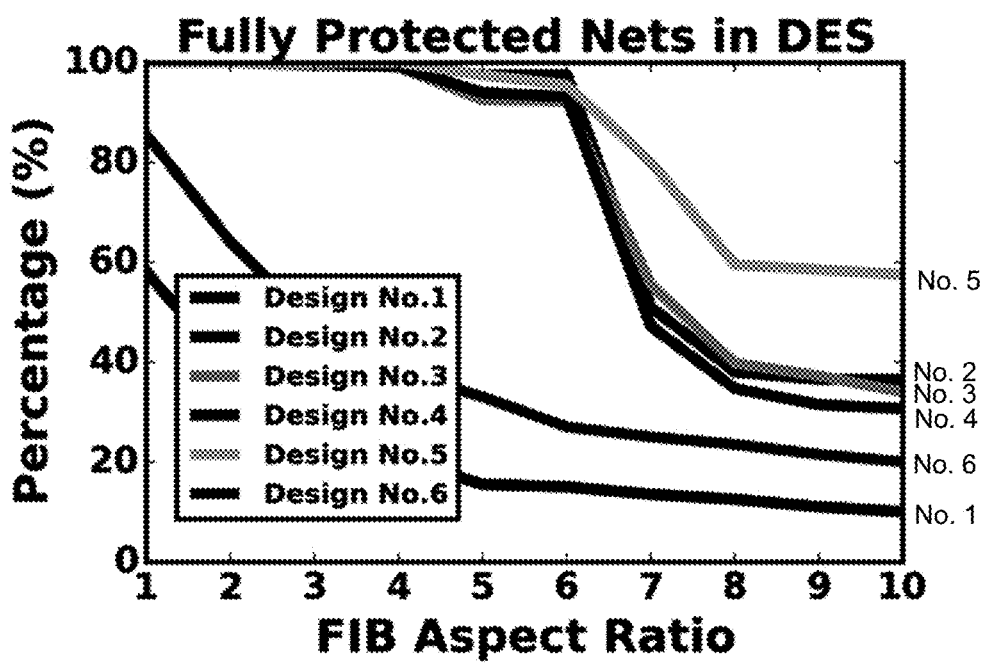

FIGS. 15C-15D are graphs showing the percentage of fully protected target nets for all designs (Designs 1-6), in which a net that does not have any exposed area is defined as being fully protected. From FIGS. 15C-15D, almost 100% of target nets for the internal shield designs (Design Nos. 2-5) are fully protected when $R_{FIB} \leq 6$, while less than 20% of the target nets are fully protected for the initial or conventional AES and DES designs (Design Nos. 1 and 6) when $R_{FIB}=6$.

With the advanced FIB (e.g., aspect ratio is 10), there are still 50% and 60% of target nets fully protected under the two-layer staggered shield (Design No. 5) for AES and DES respectively, which is about 5 times more than the original AES and DES designs (Design Nos. 1 and 6). For Design Nos. 2-4, which have the same single layer shield protection but different target nets configuration and increasing overhead as shown in Table VIII, FIGS. 15C-15D show that Design Nos. 2-4 have similar security performance which indicates that the exemplary internal shield design flow can provide guaranteed protection with different target nets configuration. Whereas, compared with the exemplary internal shield designs (Design Nos 2-4), conventional active shield designs (Design No. 6) can only reduce the exposed area to ~40% and increase the number of fully protected nets by about two-times, which is not efficient as shown in FIGS. 15A-15D.

In accordance with the present disclosure, various embodiments of systems and methods for an FIB-aware anti-probing physical design flow are presented. Such embodiments incorporate new and improved security-critical steps in a conventional physical design flow, in which the floorplanning and routing of a design are constrained to provide coverage on asset nets through an internal shield. Evaluations on AES and DES modules show that the total vulnerable exposed area to a probing attack of an exemplary FIB-aware anti-probing design can be decreased by 100% with all target nets fully protected. For example, experimental results show that the vulnerable area exposed to probing attacks for an FIB aspect ratio smaller than 5 decreases from 80% without shield protection to zero for internal shield protection in accordance with the present disclosure, i.e., all security-critical nets are completely protected or covered in AES and DES. The overhead is less than 3% for timing, power, and area.

Moreover, due to the unavoidable and stochastic wire shift, process variation, and probe tip shift, the effective probing area will shrink further over time, which makes the probe-able target area on the chip even more limited. When the FIB aspect ratio is high, even if all probe-able asset nets could be compromised, there are still considerable asset nets (>50%) that are fully protected by the various embodiments of the present disclosure. For long-bit assets like keys, extracting the remaining asset information is still exponentially difficult.

Figure 16:
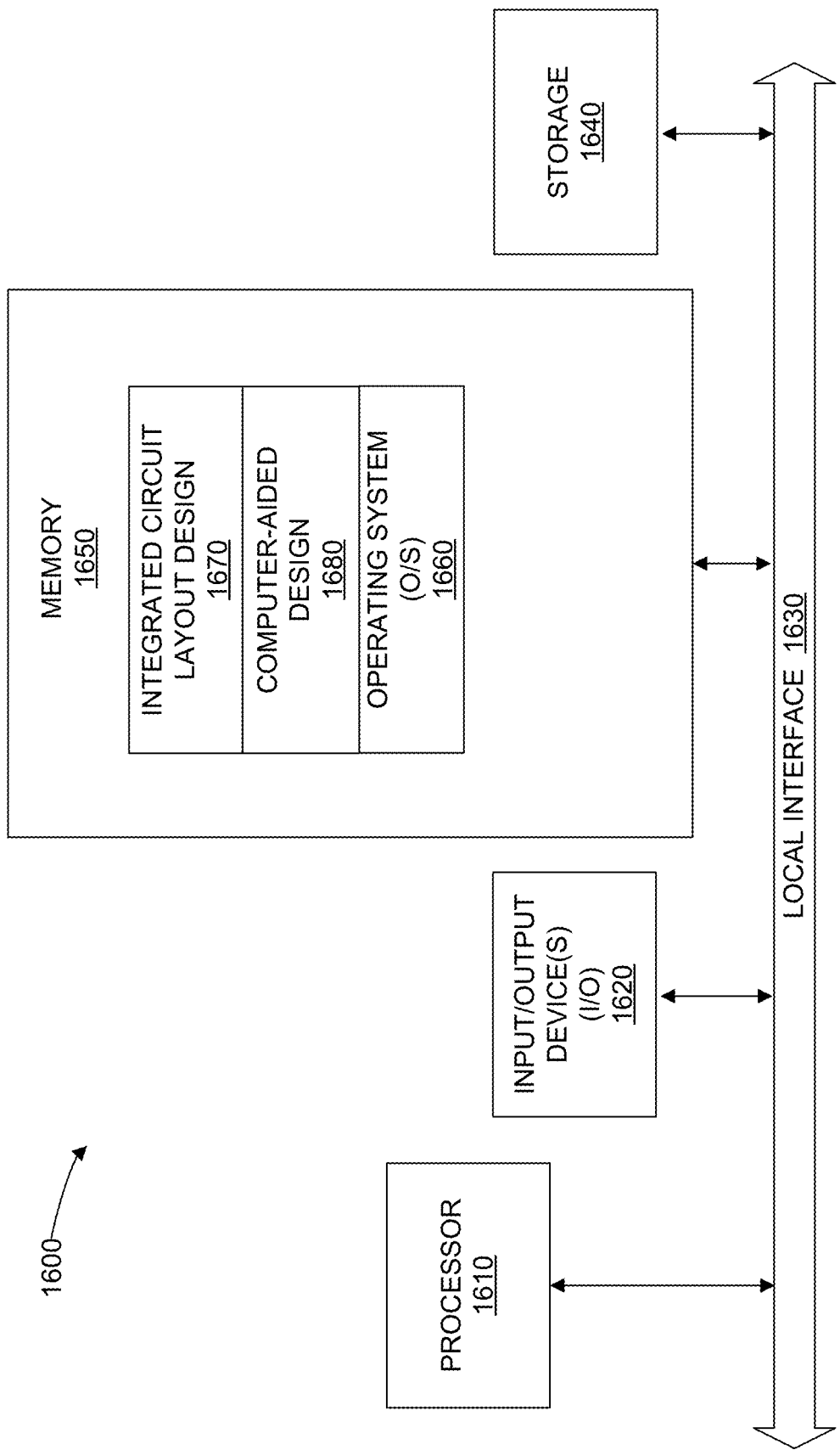
FIG. 16 is a block diagram of an exemplary integrated circuit design system in accordance with embodiments of the present disclosure.

FIG. 16 is a block diagram illustrating an example of an integrated circuit design system 1600 in accordance with various embodiments of the present disclosure. The system 1600 can be implemented on a computer and may include a processing unit 1610 (e.g., central processing unit (CPU)) and one or more input/output devices 1620 (e.g., a display/monitor, keyboard, mouse, printer, scanner, etc.) that are communicatively coupled via a local interface 1630 and permit a user to interact with software instructions being executed by the system 1600. The system 1600 may further include a persistent storage device 1640, such as a hard disk, a tape drive, an optical disk system, a removable disk system, or the like, and a memory 1650. The processing unit 1610 may control the persistent storage device 1640 and memory 1650. In one embodiment, a software application may be stored in the persistent storage device 1640 and may be loaded into the memory 1650 when the software application is to be executed by the processing unit 1610. In such an example, the memory 1650 may contain a suitable operating system (O/S) 1660, an integrated circuit layout design tool or module 1670, and/or computer-aided design application (CAD) 1680 whose functionality has been integrated with the integrated circuit layout design tool 1670, in which the integrated circuit layout design tool 1670 is programmed to perform an exemplary FIB-aware anti-probing physical design flow in accordance with embodiments of the present disclosure. In various embodiments, the integrated design layout tool 1670 may be implemented as one or more software modules that are executed by the processing unit 1610.

The integrated circuit layout design tool 1670, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. In addition, the scope of certain embodiments of the present disclosure includes functionality being embodied in hardware or software-configured mediums.

It should be emphasized that the above-described embodiments are merely possible examples of implementations, merely set forth for a clear understanding of the principles of the present disclosure. Many variations and modifications may be made to the above-described embodiment(s) without departing substantially from the principles of the present disclosure. All such modifications and variations are intended to be included herein within the scope of this disclosure.

Therefore, at least the following is claimed:

1. A method comprising:
   obtaining a gate level netlist from a functional design of an integrated circuit device;
   identifying target nets within the netlist that are vulnerable to a physical probe attack;
   identifying internal nets within the netlist to be used as shield nets to protect at least the target nets; and
   generating a design of a layout of the integrated circuit device in which the target nets are placed on a target layer of the integrated circuit device and the identified internal nets are placed on at least one internal layer of the integrated circuit device that cover the target layer, wherein a copy of the shield nets is placed on the target layer with a comparator circuit component, wherein the comparator circuit component is configured to compare signals generated by the shield nets on an upper internal layer and the copy of the shield nets on the target layer and detect a physical probe attack by finding a mismatch between the signals.

2. The method of claim 1, further comprising receiving an input of names of nets where an asset is located, wherein the identifying target nets operation calculates a target score for each of the identified nets and determines a likely target net when the target score exceeds a threshold value, wherein the target score for a net is a measure of how likely the net is to be a subject of a probing attack.

3. The method of claim 1, further comprising calculating a target score for internal nets within the netlist, wherein the identifying internal netlists that are to be used as shield nets operation is based at least upon selecting an internal net when the target score for the internal net is below a threshold value, wherein the target score for a respective net is a measure of how likely the respective net is to be a subject of a probing attack.

4. The method of claim 3, wherein the target score is a function of an information leakage metric that quantifies an amount of asset information that can be inferred by the respective net and a propagation difficulty metric that quantifies a difficulty in propagating asset information to the respective net.

5. The method of claim 4, wherein the identifying internal nets to be used as shield nets operation is further based upon a toggle frequency metric, a switching probability metric, a controllability metric, and/or a delay slack metric for the respective net.

6. The method of claim 1, wherein the at least one internal layer comprises a single internal layer.

7. The method of claim 1, wherein the at least one internal layer comprises a pair of internal layers.

8. The method of claim 7, wherein the pair of internal layers are offset from one another.

9. The method of claim 1, further comprising determining a metal layer in the integrated circuit design to route the shield nets.

10. The method of claim 9, wherein the at least one internal layer comprises a single internal layer, wherein the determining operation comprises calculating a shield security metric for different metal layers and selecting the metal layer from the different metal layers based at least in part on the shield security metric, wherein the shield security metric quantifies a maximum focused ion beam aspect ratio that a shield internal net can protect.

11. The method of claim 10, wherein the selecting of the metal layer is further based on available space that the selected metal layer provides in routing the target nets in one or more lower metal layers.

12. The method of claim 9, wherein the at least one internal layer comprises a pair of internal layers, wherein the determining operation comprises calculating a shield coverage metric for different pairs of metal layers and selecting the pair of metal layers from the different pairs of metal layers based at least in part on the shield coverage metric, wherein the shield coverage metric quantifies a maximum protection area provided by a respective pair of metal layers.

13. An integrated circuit design system comprising:
   a computer having memory and a processor that is configured to:
      obtain a gate level netlist from a functional design of an integrated circuit device;
      identify target nets within the netlist that are vulnerable to a physical probe attack;
      identify internal nets within the netlist to be used as shield nets to protect at least the target nets; and
      generate a design of a layout of the integrated circuit device in which the target nets are placed on a target layer of the integrated circuit device and the identified internal nets are placed on at least one internal layer of the integrated circuit device that cover the target layer, wherein a copy of the shield nets is placed on the target layer with a comparator circuit component, wherein the comparator circuit component is configured to compare signals generated by the shield nets on an upper internal layer and the copy of the shield nets on the target layer and detect a physical probe attack by finding a mismatch between the signals.

14. The system of claim 13, wherein the computer is further configured to receive an input of names of nets where an asset is located, wherein the identifying target nets operation calculates a target score for each of the identified nets and determines a likely target net when the target score exceeds a threshold value, wherein the target score for a net is a measure of how likely the net is to be a subject of a probing attack.

15. The system of claim 13, wherein the computer is further configured to calculate a target score for internal nets within the netlist, wherein the identifying internal netlists that are to be used as shield nets operation is based at least upon selecting an internal net when the target score for the internal net is below a threshold value, wherein the target score for a respective net is a measure of how likely the respective net is to be a subject of a probing attack.

16. The system of claim 13, wherein the computer is further configured to determine a metal layer in the integrated circuit design to route the shield nets, wherein the at least one internal layer comprises a single internal layer, wherein the determining operation comprises calculating a shield security metric for different metal layers and selecting the metal layer from the different metal layers based at least in part on the shield security metric, wherein the shield security metric quantifies a maximum focused ion beam aspect ratio that a shield internal net can protect.

17. The system of claim 13, wherein the computer is further configured to determine a metal layer in the integrated circuit design to route the shield nets, wherein the at least one internal layer comprises a pair of internal layers, wherein the determining operation comprises calculating a shield coverage metric for different pairs of metal layers and selecting the pair of metal layers from the different pairs of metal layers based at least in part on the shield coverage metric, wherein the shield coverage metric quantifies a maximum protection area provided by a respective pair of metal layers.

18. A non-transitory computer-readable storage medium having computer-executable instructions that when executed by a computer cause the computer to:
 obtain a gate level netlist from a functional design of an integrated circuit device;
 identify target nets within the netlist that are vulnerable to a physical probe attack;
 identify internal nets within the netlist to be used as shield nets to protect at least the target nets; and
 generate a design of a layout of the integrated circuit device in which the target nets are placed on a target layer of the integrated circuit device and the identified internal nets are placed on at least one internal layer of the integrated circuit device that cover the target layer, wherein a copy of the shield nets is placed on the target layer with a comparator circuit component, wherein the comparator circuit component is configured to compare signals generated by the shield nets on an upper internal layer and the copy of the shield nets on the target layer and detect a physical probe attack by finding a mismatch between the signals.

19. The non-transitory computer-readable storage medium of claim 18, wherein the computer-executable instructions further cause the computer to receive an input of names of nets where an asset is located, wherein the identifying target nets operation calculates a target score for each of the identified nets and determines a likely target net when the target score exceeds a threshold value, wherein the target score for a net is a measure of how likely the net is to be a subject of a probing attack.

20. The non-transitory computer-readable storage medium of claim 18, wherein the computer-executable instructions further cause the computer to determine a metal layer in the integrated circuit design to route the shield nets by calculating a shield security metric for different metal layers and selecting the metal layer from the different metal layers based at least in part on the shield security metric, wherein the shield security metric quantifies a maximum focused ion beam aspect ratio that a shield internal net can protect.

* * * * *